United States Patent
Sumida et al.

[19]

[11] Patent Number: 6,003,323
[45] Date of Patent: Dec. 21, 1999

[54] REFRIGERATING AIR-CONDITIONING APPARATUS

[75] Inventors: Yoshihiro Sumida; Keisuke Hokazono; Tomohiko Kasai, all of Tokyo, Japan

[73] Assignee: Mitsubshiki Denki Kabushiki Kaisha, Tokyo, Japan

[21] Appl. No.: 08/954,230

[22] Filed: Oct. 20, 1997

[30] Foreign Application Priority Data

Jan. 21, 1997 [JP] Japan ..................................... 9-008829
Jun. 20, 1997 [JP] Japan ..................................... 9-163929

[51] Int. Cl.$^6$ ................................. F25B 7/00; F25B 1/00
[52] U.S. Cl. ................................................. 62/175; 62/502
[58] Field of Search .................... 62/175, 502; 236/1 EA

[56] References Cited

U.S. PATENT DOCUMENTS 2,168,157  8/1939  Crago ..................................... 236/1 EA
4,722,195  2/1988  Suzuki et al. .......................... 62/502 X
4,961,323  10/1990 Katsuna et al. ........................ 62/502 X

FOREIGN PATENT DOCUMENTS 3-63471  3/1991  Japan .
4-155159  5/1992  Japan .

Primary Examiner—William Wayner
Attorney, Agent, or Firm—Oblon, Spivak, McClelland, Maier & Neustadt, P.C.

[57] ABSTRACT

In order to modify the composition of a non-azeotropic mixed refrigerant circulating through the refrigeration cycle of a refrigerating and air-conditioning apparatus using a refrigerant rectifier column, the level of the liquid refrigerant rich in the low-boiling point fraction that is obtained from a refrigerant rectifier column (11) and which collects in a refrigerant container (14), as well as the level of the liquid refrigerant rich in the high-boiling point fraction that collects in an accumulator (6) are adjusted so as to modify the composition of the refrigerant circulating through the refrigeration cycle. The circuit structure can be made simple, and the energy need not be supplied during the cooling and heating operations to modify the composition of the non-azeotropic mixed refrigerant.

11 Claims, 9 Drawing Sheets

FIG. 3

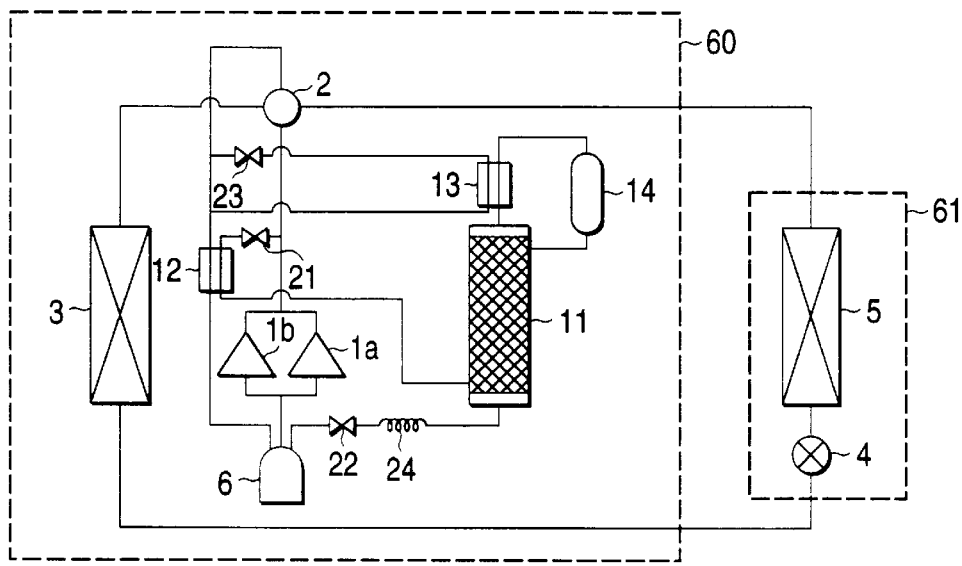

FIG. 4

4HP COMPRESSOR OPERATED ALONE + CIRCULATING REFRIGERANT'S COMPOSITION CONTROLLED

BOTH 6HP AND 4HP COMPRESSORS OPERATED + CIRCULATING REFRIGERANT'S COMPOSITION CONTROLLED

6HP COMPRESSOR OPERATED ALONE + CIRCULATING REFRIGERANT'S COMPOSITION CONTROLLED

EFFICIENCY (= PERFORMANCE DIVIDED BY ELECTRICAL INPUT)

10HP COMPRESSOR CONTROLLED IN ROTATIONAL SPEED BY INVERTER

BOTH CIRCULATING REFRIGERANT'S COMPOSITION AND THE NUMBER OF OPERATING COMPRESSOR UNITS CONTROLLED

REFRIGERATING AIR-CONDITIONING APPARATUS

BACKGROUND OF THE INVENTION

The present invention relates to a refrigerating air-conditioning apparatus using a non-azeotropic mixed refrigerant, particularly to one that is capable of changing the composition of a refrigerant circulating through a refrigeration cycle such as to exhibit load-matching performance at all times of its operation.

FIG. 15 shows the layout of a conventional refrigerating air-conditioning apparatus using a non-azeotropic mixed refrigerant as proposed in Examined Japanese Patent Publication No. Hei 6-12201. In the drawing, numeral 1 refers to a compressor, 32 a condenser, 33 and 34 capillaries and 35 an evaporator; these components are connected by pipes sequentially to form a refrigeration cycle using a non-azeotropic mixed refrigerant consisting of a high-boiling point fraction and a low-boiling point fraction.

Shown by 11 is a refrigerant rectifying column, the bottom of which is connected to a loop including a heater 41 and a lower refrigerant container 42 whereas the top of the column is connected to a loop including a cooler 13 and an upper refrigerant container 14. The upper refrigerant container 14 is connected between the condenser 32 and the evaporator 35 via a solenoid valve 43 and so is the lower refrigerant container 42 via a solenoid valve 44. Provided upstream of the evaporator 35 are a capillary 45 and a solenoid valve 46, via which the evaporator is connected to the upper refrigerant container 14; the evaporator 35 is also connected to the lower refrigerant container 42 via the capillary 45 and a solenoid valve 47. The heater 41 is an electric heater and the cooler 13 is a water-cooled heat exchanger.

Being constructed in the way just described above, the prior art refrigerating air-conditioning apparatus using a non-azeotropic mixed refrigerant is operated in the following manner. The vapor of a non-azeotropic mixed refrigerant compressed to a higher temperature and pressure in the compressor 1 condenses in the condenser 32 and flows into the capillary 33. During normal operation, solenoid valves 43, 44, 46 and 47 are closed so that the refrigerant passes through the capillary 34 to turn into a low-temperature and pressure refrigerant consisting of a vapor and a liquid phase, which then flows into the evaporator 35 and the resulting vapor returns to the compressor 1.

In order to increase the high-boiling point fraction of the refrigerant circulating through the refrigeration cycle, the following procedure may be taken. Solenoid valves 43 and 46 are closed and solenoid valves 44 and 47 are opened so that a portion of the refrigerant emerging from the capillary 33 is diverted to solenoid 44, thence flowing into the lower refrigerant container 42. A portion of the refrigerant entering the lower refrigerant container 42 passes through solenoid 47 to flow into the capillary 45, where it merges with the refrigerant flowing through the main circuit on the side upstream of the evaporator 35. The remainder of the refrigerant entering the lower refrigerant container 42 is heated in the heater 41 and the resulting vapor ascends through the refrigerant rectifying column 11. At the same time, the liquid refrigerant stored in the upper refrigerant container 14 descends through the refrigerant rectifying column 11 and contacts the ascending refrigerant vapor to perform a so-called "rectifying action" by the resulting vapor-liquid contact. As it ascends through the rectifying column 11, the refrigerant vapor becomes enriched with the low-boiling point fraction. It is then liquefied in the cooler 13 and collects in the upper refrigerant container 14; thus, only the refrigerant rich in the low-boiling point fraction is stored in the upper refrigerant container 14. In other words, the remainder of the refrigerant which flows through the refrigeration cycle is enriched with the high-boiling point fraction.

In order to increase the low-boiling point fraction of the refrigerant circulating through the refrigeration cycle, the following procedure may be taken. Solenoid valves 43 and 46 are opened and solenoid valves 44 and 47 are closed so that a portion of the refrigerant emerging from the capillary 33 is diverted to solenoid valve 43, thence flowing into the upper refrigerant container 14. A portion of the refrigerant entering the upper refrigerant container 14 passes through the capillary 45 and emerges with the main circuit stream, and the remainder of the refrigerant enters the refrigerant rectifying column 11, through which it descends. At the same time, a portion of the liquid refrigerant in the lower refrigerant container 42 is heated in the heater 41 and the resulting vapor ascends through the refrigerant rectifying column 11 to contact the descending liquid refrigerant, thereby achieving a so-called "rectifying action" through the resulting vapor-liquid contact. The descending liquid refrigerant becomes gradually enriched with the high-boiling point fraction and collects in the lower refrigerant container 42; thus, only the refrigerant rich in the high-boiling point fraction is stored in the lower refrigerant container 42. In other words, the remainder of the refrigerant which flows through the refrigeration cycle is enriched with the low-boiling point fraction.

Another example of the prior art apparatus may be found in Examined Japanese Patent Publication No. Hei 2-47668.

As described above, the conventional refrigerating air-conditioning apparatus which uses a non-azeotropic mixed refrigerant utilizes a refrigerant rectifying column in order to increase both the high-boiling and low-boiling point fractions of the refrigerant circulating through the refrigeration cycle; therefore, the overall circuit configuration is complicated and energy is required at all times of the cooling and heating operations. In particular, the use of an electric heater requires extra power input when the refrigerant composition is changed and this reduces the energy efficiency of the refrigerating air-conditioning apparatus.

In addition, the performance of the apparatus cannot be controlled over a practically broad dynamic range by merely changing the composition of the refrigerant; in order to deal with this difficulty, the additional control of the performance by changing the rotational speed of the compressor with an inverter may be invoked. This approach is capable of increasing the dynamic range of performance control but, on the other hand, due to the loss in the inverter or motor, the change in the rotational speed of the compressor eventually lowers the efficiency of the refrigerating air-conditioning apparatus.

SUMMARY OF THE INVENTION

The present invention has been accomplished under these circumstances and has as an object providing a refrigerating air-conditioning apparatus using a non-azeotropic mixed refrigerant that allows for changes in the refrigerant composition over a broad range in both cooling and heating operations without employing an electric heater but adopting a simple circuit configuration and which additionally is capable of achieving performance control over a broad range with high efficiency.

Another object of the invention is to provide a refrigerating air-conditioning apparatus using a non-azeotropic mixed refrigerant that allows for performance control over a broad range with high efficiency without using an inverter to change the rotational speed of the compressor and which hence is capable of absorbing abrupt load variations on user's side without imposing undue strains on the compressor.

The present invention provides refrigerating air-conditioning apparatuses having the following features.

(1) A refrigerating air-conditioning apparatus which uses a non-azeotropic mixed refrigerant comprises a refrigeration cycle comprising a compressor, a heat exchanger on the heat source side, a first pressure reducer and a heat exchanger on the user side, a non-azeotropic mixed refrigerant consisting of a low-boiling point refrigerant and a high-boiling point refrigerant, a refrigerant rectifier column for producing a refrigerant rich in the high-boiling point fraction from a portion of the mixed refrigerant, a first refrigerant reservoir for storing a refrigerant rich in the low-boiling point fraction which exits the refrigerant rectifier column and a second refrigerant reservoir for storing a refrigerant rich in the high-boiling point fraction, and the levels of the liquid refrigerant in the first and the second refrigerant reservoir are adjusted to change the composition of the mixed refrigerant continuously.

(2) A refrigerating air-conditioning apparatus which uses a non-azeotropic mixed refrigerant comprises a refrigeration cycle comprising a compressor, a heat exchanger on the heat source side, a first pressure reducer and a heat exchanger on the user side, a non-azeotropic mixed refrigerant consisting of a low-boiling point refrigerant and a high-boiling point refrigerant and a refrigerant rectifier column for producing a refrigerant rich in the low-boiling point fraction from a portion of the mixed refrigerant, and the high-pressure side extending form the exit of the compressor to said first pressure reducer is connected to the bottom of the refrigerant rectifier column via a first ON/OFF valve and a first cooler whereas the bottom of said refrigerant rectifier column is connected to the low-pressure side extending from said first pressure reducer to the entrance of the compressor via a second pressure reducer and a second ON/OFF valve, and a loop including a second cooler and a first refrigerant reservoir is connected to the top of the refrigerant rectifier column.

(3) A refrigerating air-conditioning apparatus which uses a non-azeotropic mixed refrigerant comprises a refrigeration cycle comprising a compressor, a heat exchanger on the heat source side, a first pressure reducer and a heat exchanger on the user side, a non-azeotropic mixed refrigerant consisting of a low-boiling point refrigerant and a high-boiling point refrigerant and a refrigerant rectifier column for producing a refrigerant rich in the low-boiling point fraction from a portion of said mixed refrigerant, and the high-pressure side extending from the exit of the compressor to the first pressure reducer is connected to the bottom of the refrigerant rectifier column via a first ON/OFF valve and a first cooler whereas the bottom of the refrigerant rectifier column is connected to the low-pressure side extending from said first pressure reducer to the entrance of the compressor via a second pressure reducer and a second ON/OFF valve, the top of the refrigerant rectifier column is connected to a first refrigerant reservoir via a second cooler, the pipe between the second cooler and the first refrigerant reservoir is connected to the top of the refrigerant rectifier column, and the bottom of the first refrigerant reservoir is connected to the low-pressure side extending from the first pressure reducer to the entrance of the compressor via a third pressure reducer and a third ON/OFF valve.

(4) In the refrigerating air-conditioning apparatus set forth in (2) or (3) which uses a non-azeotropic mixed refrigerant, the first cooler is adapted to be such that the pipe connecting the first ON/OFF valve and the refrigerant rectifier column is subjected to heat exchange with the pipe extending from the first pressure reducer to the entrance of the compressor.

(5) In the refrigerating air-conditioning apparatus set forth in (2) or (3), which uses a non-azeotropic mixed refrigerant, the first cooler is adapted to be such that the pipe connecting the first ON/OFF valve and the bottom of the refrigerant rectifier column is subjected to heat exchange with the pipe connecting the second pressure reducer and the second ON/OFF valve.

(6) A refrigerating air-conditioning apparatus which uses a non-azeotropic mixed refrigerant comprises a refrigeration cycle comprising a compressor, a heat exchanger on the heat source side, a first pressure reducer and a heat exchanger on the user side, a non-azeotropic mixed refrigerant consisting of a low-boiling point refrigerant and a high-boiling point refrigerant and a refrigerant rectifier column for producing a refrigerant rich in the low-boiling point fraction from the mixed refrigerant, and the high-pressure side extending from the exit of said compressor to said first pressure reducer is connected to the bottom of said refrigerant rectifier column via a fourth ON/OFF valve, the bottom of the refrigerant rectifier column is connected to the low-pressure side extending from said first pressure reducer to the entrance of said compressor via a second pressure reducer and a second ON/OFF valve, a loop including a second cooler and a first refrigerant reservoir is connected to the top of the refrigerant rectifier column, and an auxiliary heat exchanger is provided such that the pipe by which the high-pressure and temperature side extending from the exit of the compressor to the first pressure reducer is connected to the bottom of the refrigerant rectifier column via said fourth ON/OFF valve is subjected to heat exchange with the pipe connecting via said second cooler to the low-pressure side extending from the first pressure reducer to the entrance of the compressor.

(7) In the refrigerant air-conditioning apparatus set forth in (6) which uses a non-azeotropic mixed refrigerant, the pipe for the liquid side extending from the heat exchanger on the heat source side to the first pressure reducer is connected to the auxiliary heat exchanger via a fifth ON/OFF valve and a fourth pressure reducer.

(8) The refrigerating air-conditioning apparatus set forth in any one of (2) to (7) which uses a non-azeotropic mixed refrigerant has the second cooler provided within the first refrigerant reservoir.

(9) The refrigerating air-conditioning apparatus set forth in any one of (1) to (8) which uses a non-azeotropic mixed refrigerant employs a plurality of compressor units connected in parallel and the number of operating compressor units is controlled.

(10) In the refrigerating air-conditioning apparatus set forth in (9) which uses a non-azeotropic mixed refrigerant, two compressor units, one having a greater capacity than the other, are provided such that a minimal output produced by compositional adjustment from the compressor of the greater capacity is smaller than a maximal output produced by compositional adjustment form the compressor of the smaller capacity.

(11) The refrigerating air-conditioning apparatus set forth in (10) which uses a non-azeotropic mixed refrigerant satisfies the following relation:

$$B \times n/(m-n) \leq A \leq B \times m/n$$

where A is the capacity of the compressor of the greater capacity; B is a capacity of the compressor of the smaller capacity; m is a maximal value for the range of performance control by adjustment of the refrigerant's composition; and n is a minimal value for the range of performance control by adjustment of the refrigerant's composition, and the number of operating compressor units is controlled with one compressor being combined with the other.

(12) The refrigerating air-conditioning apparatus set forth in (10) or (11) which uses a non-azeotropic mixed refrigerant satisfies the following relation:

$$\{(k/m)-A-B\}/z \leq C \leq [(m/n)A+\{(m-n)/n\}B]/z$$

where A is the capacity of the compressor of the greater capacity; B is the capacity of the compressor of the smaller capacity; C is the capacity of at least one compressor compensating for the insufficiency in the load of the heat exchanger on the user side that can be handled by the two compressors having the capacities A and B; m is a maximal value for the range of performance control by adjustment of the refrigerant's composition; n is a minimal value for the range of performance control by adjustment of the refrigerant's composition; k is the load on the user side; and z is the number of compressor units having the capacity C, and the number of operating compressor units is controlled with the respective compressors being combined with each other.

(13) The refrigerating air-conditioning apparatus set forth in any one of (1), (2), (3), (6), (9) and (10) which uses a non-azeotropic mixed refrigerant has an auxiliary heat exchanger in such a way that the pipe by which the high-pressure and temperature side extending from the exit of the compressor to the first pressure reducer is connected to the bottom of the refrigerant rectifier column via the fourth ON/OFF valve is subjected to heat exchange with the pipe connecting via the second cooler to the low-pressure side extending from the first pressure reducer to the entrance of the compressor.

BRIEF DESCRIPTION OF THE DRAWINGS

In the accompanying drawings:

FIG. 3 is a diagram showing a refrigerant circuit configuration according to Embodiment 2 of the invention;

FIG. 4 is a graph showing the performance control range and the efficiency of the refrigerating air-conditioning apparatus shown in FIG. 3;

DETAILED DESCRIPTION OF THE PREFERRED EMBODIMENTS

Embodiment 1

Figure 1:
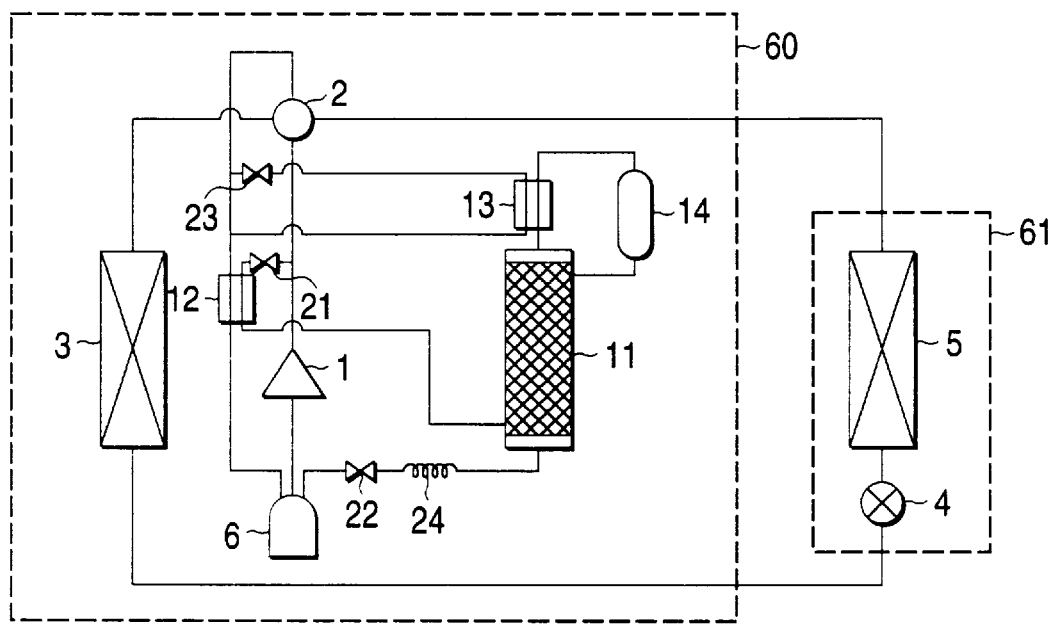
FIG. 1 is a diagram showing a refrigerant circuit configuration according to Embodiment 1 of the invention.
Figure 15:
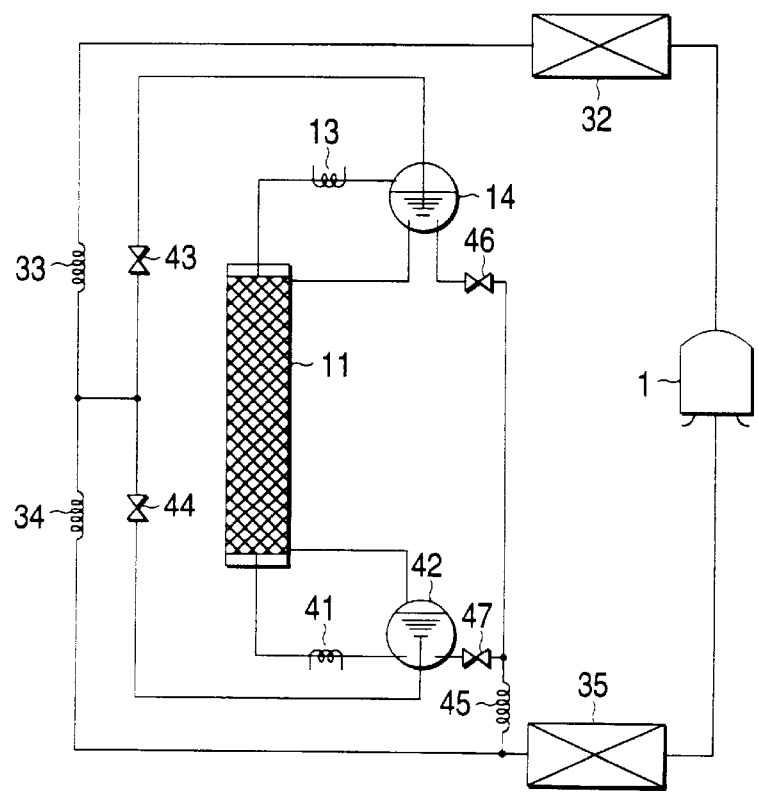
FIG. 15 is a diagram showing the refrigerant circuit configuration of a prior art refrigerating air-conditioning apparatus using a non-azeotropic mixed refrigerant.

FIG. 1 is a diagram showing a refrigerant circuit configuration according to an embodiment of the invention and the components or parts which are identical to those of the prior art apparatus shown in FIG. 15 are identified by like numerals. In the drawing, numeral 60 refers to an outdoor machine which comprises a compressor 1, a four-way valve 2, a heat exchanger 3 on the heat source side and an accumulator 6 which is a second refrigerant reservoir. Numeral 61 refers to an indoor machine comprising an electrical expansion valve 4 which is a first pressure reducer and a heat exchanger 5 on the user side. The outdoor machine 60 and the indoor machine 61 are connected by two pipes to form a refrigeration cycle, which is loaded with a non-azeotropic mixed solvent consisting of a high-boiling point fraction and a low-boiling point fraction. The heat exchanger 3 on the heat source side works as an evaporator during a heating operation and as a condensor during a cooling operation. The heat exchanger 5 on the user side works as a condenser during a heating operation and as an evaporator during a cooling operation.

Shown by 11 is a refrigerant rectifying column which is filled with a packing agent to increase the area of vapor-liquid contact. The exit of the compressor 1 is connected to the bottom of the refrigerant rectifying column 11 by means of a pipe via a solenoid valve 21 which is a first ON/OFF valve, with a first cooler 12 being provided halfway the pipe for performing heat exchange with the intake pipe to the compressor 1. The bottom of the refrigerant rectifying column 11 is connected to the accumulator 6 by means of a pipe via a capillary 24 which is a second pressure reducer and a solenoid valve 22 which is a second ON/OFF valve. A loop including a second cooler 13 and a refrigerant container 14 is connected to the top of the refrigerant rectifier column 11 and the second cooler 13 is adapted to be such that a portion of the refrigerant to be drawn into the compressor 1 can flow into said second cooler via a solenoid valve 23. The refrigerant rectifier column 11, the refrigerant container 14 which is a first refrigerant reservoir, the first cooler 12, the second cooler 13, solenoid valves 21, 22 and 23, the capillary 24 and the pipes connecting these components are all contained in the outdoor machine 60.

Being constructed in the way described above, the apparatus according to the first embodiment of the invention will operate as follows in a heating mode.

During operation in the heating mode, the refrigerant vapor compressed to a higher temperature and pressure state by means of the compressor 1 passes through the four-way valve 2 and condenses to liquefy in the heat exchanger 5 on the user side which works as a condenser; the liquid refrigerant then passes through the electrical expansion valve 4, where it is allowed to expand to a lower pressure to produce a low-pressure refrigerant consisting of two phases, vapor and liquid, which then flows into the heat exchanger 3 on the heat source side which works as an evaporator. The refrigerant evaporates in the heat exchanger 3 and passes through the four-way valve 2 and the accumulator 6 to return to the compressor 1. The electrical expansion valve 4 has its opening controlled in such a way that the degree of supercooling of the refrigerant at the exit of the heat exchanger 5 on the user side is at an appropriate level (say, 10° C.), and the surplus refrigerant in the refrigeration cycle is stored in the accumulator 6. The refrigerant in the accumulator 6 is separated into a liquid refrigerant rich in the high-boiling point fraction and a vaporized refrigerant rich in the low-boiling point fraction. Accordingly, if the liquid refrigerant collects in the accumulator 6, the refrigerant circulating through the refrigeration cycle has a higher content of the low-boiling point fraction than the refrigerant initially loaded in the cycle.

In order to increase the high-boiling point fraction of the refrigerant circulating through the refrigeration cycle, the following procedure may be taken. First, solenoid valves 21, 22 and 23 are opened. A portion of the high-temperature and pressure refrigerant vapor exiting the compressor 1 passes through solenoid 21 to flow into the first cooler 12. In the first cooler 12, the hot refrigerant vapor is cooled with the low-temperature and pressure refrigerant to be drawn into the compressor, whereupon it is either saturated or brought to a two-phase state consisting of a vapor and a liquid phase. The high-pressure two-phase refrigerant exiting the first cooler 12 flows into the bottom of the refrigerant rectifier column 11 and the vapor phase ascends through the column 11. The ascending refrigerant vapor emerges from the top of the rectifier column 11 to flow into the second cooler 13, where it is cooled with the cold influent refrigerant to the compressor which has flowed into the second cooler 13 via solenoid valve 23, whereupon it condenses to liquefy. The resulting liquid refrigerant flows into the refrigerant container 14, where it collects. Since the refrigerant container 14 is in a higher position than the refrigerant rectifier column 11, a portion of the liquid refrigerant in the container 14 flows as a reflex into the rectifier column 11 from the top. Thus, the rectifier column 11, the ascending refrigerant vapor contacts the descending liquid refrigerant and the resulting heat and mass transfer provides a so-called "rectifying action" such that the refrigerant vapor ascending through the rectifier column 11 becomes progressively enriched with the low-boiling point fraction, causing the liquid refrigerant rich in the low-boiling point fraction to collect in the refrigerant container 14. The liquid refrigerant descending through the rectifier column 11 and the liquid phase of the two-phase refrigerant flowing into the rectifier column 11 are brought to a lower pressure by means of the capillary 24 and passed through solenoid valve 22 to flow into the accumulator 6.

As more of the liquid refrigerant collects in the refrigerant container 14, less of the liquid refrigerant is present in the accumulator 6 so that the liquid refrigerant rich in the high-boiling point fraction which has been stored in the accumulator 6 is released into the refrigeration cycle whereas the liquid refrigerant rich in the low-boiling point fraction will collect in the refrigerant container 14. As a result, the composition of the refrigerant circulating through the refrigeration cycle is adjusted to be rich in the high-boiling point fraction.

When the high-boiling point fraction of the refrigerant circulating through the refrigeration cycle increases and the heating performance of the apparatus decreases to match the load on the user side, solenoid valves 21, 22 and 23 may be closed to ensure that the composition of the circulating refrigerant is maintained in a load matching state.

We next describe the case of changing the composition of the refrigerant circulating through the refrigeration cycle from the state where it is enriched with the high-boiling point fraction to a state where it is enriched with the low-boiling point fraction. To meet this requirement, solenoid valves 21 and 23 are closed and solenoid valve 22 is opened. Then, no refrigerant is supplied into the rectifying column 11 and the high-pressure liquid refrigerant rich in the low-boiling point fraction collecting in the refrigerant container 14 descends from the top to the bottom of the rectifier column 11, has its pressure reduced by means of the capillary 24 and passes through the solenoid valve 22 to flow into the accumulator 6. Thus, the refrigeration cycle is supplied with the liquid refrigerant rich in the low-boiling point fraction coming from the refrigerant container 14; in addition, more of the liquid refrigerant rich in the high-boiling point fraction will collect in the accumulator, thereby ensuring that the refrigerant circulating through the refrigeration cycle is enriched with the low-boiling point fraction.

When the low-boiling point fraction of the refrigerant circulating through the refrigeration cycle increases and the heating performance of the apparatus increases to match the load on the user side, solenoid valve 22 is closed (solenoid valves 21 and 23 are already closed) to ensure that the composition of the circulating refrigerant is maintained in a load matching state.

We now consider the operation of the apparatus in a cooling mode. During operation in the cooling mode, the refrigerant vapor compressed to a higher temperature and pressure by means of the compressor 1 passes through the four-way valve 2 and condenses to liquefy in the heat exchanger 3 on the heat source side which works as a condenser; the liquid refrigerant then passes through the electrical expansion valve 4, where it is allowed to expand to a lower pressure to produce a low-pressure refrigerant consisting of two phases, liquid and vapor, which then flows into the heat exchanger 5 on the user side which works as an evaporator. The refrigerant evaporates in the heat exchanger 5 and passes through the four-way valve 2 and the accumulator 6 to return to the compressor 1. The electrical expansion valve 4 has its opening controlled in such a way that the degree of supercooling of the refrigerant at the exit of the heat exchanger 3 on the heat source side is at an appropriate level (say, 10° C.), and the surplus refrigerant in the refrigeration cycle is stored in the accumulator 6. The procedures of changing the composition of the refrigerant circulating through the refrigeration cycle during the cooling operation are identical to those already described in connection with the heating mode and hence need not be reiterated, except that in the first embodiment of the invention, the composition of the circulating refrigerant can be varied over a broad range in both the cooling and heating operations.

Figure 2:
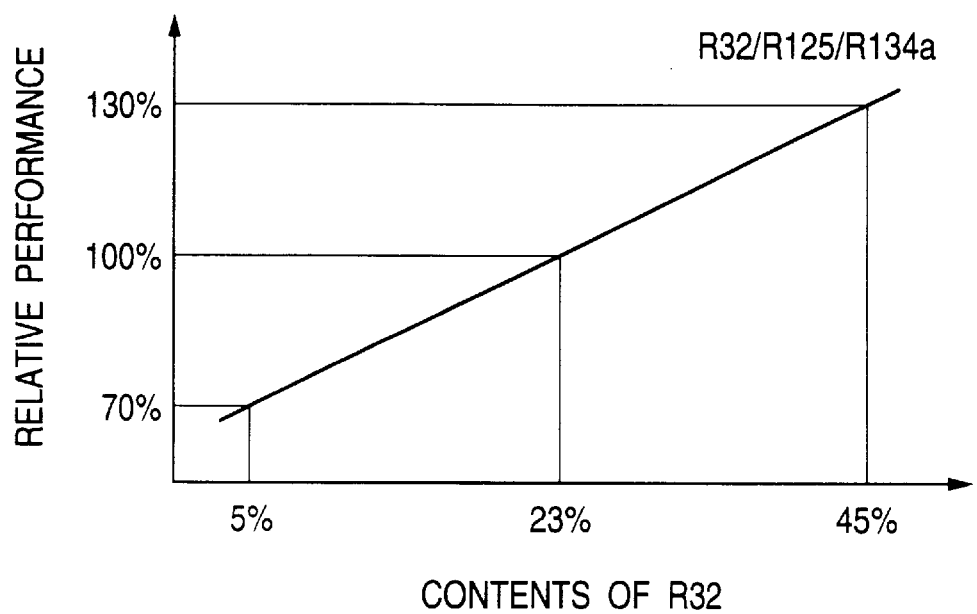
FIG. 2 is a graph showing how the proportions of R32, R125 and R134a are related to refrigeration performance.

In general, the performance of a refrigeration cycle using a non-azeotropic mixed refrigerant increases with the increasing content of the low-boiling point fraction in the circulating refrigerant and decreases with the increasing content of the high-boiling point fraction. FIG. 2 illustrates the composition-dependent performance of a mixed refrigerant consisting of three components R32, R125 and R134a. The horizontal axis of the graph plots the content of the low-boiling point fraction R32 and the vertical axis plots the relative performance of the refrigerant, with the value for the presence of 23% R32 (25% R125 and 52% R134a) being taken as 100. As the content of R32 increases (the low-boiling point fraction increases), the density of the refrigerant being drawn into the compressor increases, causing an increased flow of the refrigerant to circulate through the refrigeration cycle and this combines with the increased latent heat of the refrigerant to eventually enhance its performance. If the content of R32 increases to 45% (with R125 being 38% and R134a 17%), the performance increases by about 30% compared to the case where the content of R32 is 23%. Conversely, if the content of R32 decreases (the high-boiling point fraction increases), both the density and the latent heat of the refrigerant decrease to cause a performance drop; if the content of R32 decreases to 5% (with R125 being 7% and R134a 88%), the performance decreases by about 30% compared to the case where the content of R32 is 23%. Thus, in a refrigeration cycle loaded with a refrigerant consisting of a mixture of 23% R32, 25% R125 and 52% R134a, the refrigeration performance which is assumed to be 100 at the loading composition (23% R32) can be controlled to vary from 130% to 70% by adjusting the content of R32 to vary from 45% to 5%.

While the method of performance control by adjusting the composition of the circulating refrigerant in accordance with the present invention has been described above in detail, it may be summarized as follows. To start up the refrigeration cycle, solenoid valves 21 and 23 are closed and solenoid valve 22 is opened such that the liquid refrigerant in the container 14 is entirely supplied into the accumulator 6. In this state, any surplus refrigerant collects in the accumulator 6, so the composition of the circulating refrigerant is rich with the low-boiling point fraction, permitting the heating or cooling operation to be performed at maximum capacity. If the apparatus operating under this condition detects a load drop on the basis of such information as the difference between the temperature setting of the indoor machine 61 and the temperature of outside air being drawn into the machine, solenoid valves 21, 22 and 23 are opened and the refrigerant output from the compressor 1 is admitted into the rectifying column 11 such that the liquid refrigerant rich in the low-boiling point fraction collects gradually in the container 14. As more of the liquid refrigerant collects in the container 14, the liquid refrigerant in the accumulator 6 decreases and the composition of the refrigerant circulating through the refrigeration cycle is progressively enriched with the high-boiling point fraction, whereby the heating or cooling performance is gradually reduced. If the apparatus operating under this condition detects a performance match with the load on the basis of such information as the difference between the temperature setting of the indoor machine 61 and the temperature of the outside air being drawn into the machine, solenoid valves 21, 22 and 23 are closed and the supply of the refrigerant into the rectifier 11 is stopped and the levels of the liquid refrigerant in the container 14 and the accumulator 6 are held constant such that the composition of the circulating refrigerant is kept constant, thereby ensuring that the heating or cooling performance is maintained to have a match with the load. If the apparatus operating under this condition with its performance matching the load detects a load increase on the basis of such information as the difference between the temperature setting of the indoor machine 61 and the temperature of the outside air being drawn into the machine, solenoid valve 22 is opened with solenoid valves 21 and 23 remaining closed such that the liquid refrigerant rich in the low-boiling point fraction is transferred from the container 14 into the accumulator 6. As less of the liquid refrigerant is present in the container 14, the liquid refrigerant in the accumulator 6 increases and the composition of the refrigerant circulating through the refrigeration cycle is progressively enriched with the low-boiling point fraction, whereby the heating or cooling performance is gradually increased. If the apparatus operating under this condition detects a performance match with the load on the basis of such information as the difference between the temperature setting of the indoor machine 61 and the temperature of the outside air being drawn into the machine, solenoid valve 22 is closed and the supply of the refrigerant from the container 14 into the accumulator 6 is stopped and the levels of the liquid refrigerant in the container 14 and the accumulator 6 are held constant such that the composition of the circulating refrigerant is kept constant, thereby ensuring that the heating or cooling performance is maintained to have a match with the load. Thus, by opening or closing solenoid valves 21, 22 and 23 in the manner outlined above, the levels of the liquid refrigerant in the container 14 and the accumulator 6 are adjusted and the composition of the refrigerant circulating through the refrigeration cycle is controlled to ensure that the apparatus keeps operating to exhibit load matching performance in both heating and cooling modes.

In the present invention, the level of the liquid refrigerant rich in the low-boiling point fraction which is to collect in the refrigerant container 14 and that of the liquid refrigerant rich in the high-boiling point fraction which is to collect in the accumulator 6 are adjusted such as to modify the composition of the refrigerant circulating through the refrigeration cycle whether it is in a heating or a cooling mode; as a result, the overall circuit configuration is simplified and the composition of the circulating refrigerant can be modified over a broad range at low cost.

If the capacities of the refrigerant container 14 and the accumulator 6 are increased, optionally combined with the loading of an increased amount of the refrigerant in the refrigeration cycle, to increase the amount of surplus refrigerant, the range over which the composition of the circulating refrigerant can be varied is further increased to thereby expand the dynamic range of performance control.

In addition, the refrigerant to be supplied to the rectifier column 11 in order to enrich the circulating refrigerant with the high-boiling point fraction is in the form of the saturated vapor that is prepared by cooling a portion of the vaporized refrigerant output from the compressor 1 with the refrigerant to be drawn into the compressor 1; this feature eliminates the need to employ the electric heater and other heating sources that have been necessary in the prior art, with the added advantage of an increased energy efficiency. When modifying the composition of the circulating refrigerant to one rich in the low-boiling point fraction, the refrigerant rectifier column 11 is not used but the liquid refrigerant rich in the low-boiling point fraction which has been stored in the container 14 is supplied into the accumulator 6 and this eliminates the energy conventionally required for heating and cooling purposes, thereby achieving a further improvement in energy efficiency.

Another feature of the invention is that all components including the refrigerant rectifying column, refrigerant container and the accumulator that are necessary for controlling the composition of the circulating refrigerant are accommodated in the outdoor machine; therefore, the refrigerating air-conditioning apparatus of the invention is easy to assemble and it can be readily installed on the site.

The above description of the first embodiment of the invention assumes that the accumulator is fitted on the intake pipe to the compressor; however, it should be noted that even in the absence of the accumulator, the composition of the circulating refrigerant can be modified by adjusting the level of the liquid refrigerant in the container 14.

Embodiment 2

FIG. 3 is a diagram showing a refrigerant circuit configuration according to another embodiment of the invention, in which the compressor 1 comprises a parallel connection of two compressor units 1a and 1b, the former having a larger capacity than the latter. The low-boiling or high-boiling point fraction of the refrigerant circulating through the refrigeration cycle may be increased by the same methods as employed for the system shown in FIG. 1; however, depending on the constituents combined to make the non-azeotropic mixed refrigerant, it is sometimes impossible to ensure a satisfactorily wide range for performance control even if the composition of the circulating refrigerant is varied over a wide range. To deal with this situation, the second embodiment of the invention is adapted to be such that the compressor is composed of a parallel connection of two units 1a and 1b, the former having a larger capacity than the latter, and the performance control by adjustment of the composition of the circulating refrigerant is combined with the performance control by adjustment of the number of operating compressor units, thereby ensuring that a broad range for performance control is realized with high efficiency.

Let assume that compressor 1a has a capacity of 6 HP and compressor 1b 4HP, both being driven at a fixed rotational speed equivalent to 50 Hz or 60 Hz. Also assume that by adjusting the level of the liquid refrigerant rich in the low-boiling pint fraction which is to collect in the refrigerant container 14 (i.e., the first refrigerant reservoir) and the level of the liquid refrigerant rich in the high-boiling point fraction which is to collect in the accumulator 6 (i.e., the second refrigerant reservoir), the composition of the refrigerant circulating through the refrigeration cycle is modified to ensure performance control over the range of 130 to 70%. Given these conditions, the range over which the overall performance of the refrigeration cycle can be controlled is from 13 HP to 7 HP when compressor unit 1a (6 HP) is operating simultaneously with compressor unit 1b (4 HP), from 7.8 HP to 4.2 HP when only compressor 1a (6 HP) is operating, and from 5.2 HP to 2.8 HP when only compressor unit 1b (4 HP) is operating; thus, the refrigeration performance can be controlled continuously over the broad range of 13 HP to 2.8 HP.

In addition, each compressor unit is operating at the fixed frequency and, hence, their efficiency is maintained constant within the range of 13 HP to 2.8 HP as indicated by a solid line in FIG. 4. In the conventional refrigeration cycle in which the performance is controlled by controlling the operating rotational speed of a 10-HP compressor with an inverter, the efficiencies of the inverter and the motor will decrease in response to changes in the operating frequency, thereby causing a drop in overall efficiency as indicated by a dashed line in FIG. 4.

Thus, according to the second embodiment of the invention, the compressor is composed of two compressor units 1a and 1b connected in parallel, the former having a greater capacity than the latter, and the performance control by adjustment of the composition of the circulating refrigerant is combined with the performance control by adjustment of the number of operating compressor units such that the refrigeration performance can be controlled over a broad range. In addition, the two compressor units operate at a fixed frequency and, hence, they will not experience any drop in efficiency but can be operated with high efficiency.

The foregoing description of the second embodiment assumes that a single unit of the indoor machine 61 is connected to the outdoor machine; if desired, more than one unit of the indoor machine may be connected and depending on the number of operating indoor machine units, the performance control by adjustment of the composition of the circulating refrigerant may be combined with the performance control by adjustment of the number of operating compressor units such that the apparatus can at all times exhibit performance that matches the number of operating indoor machine units.

Embodiment 3

Figure 5:
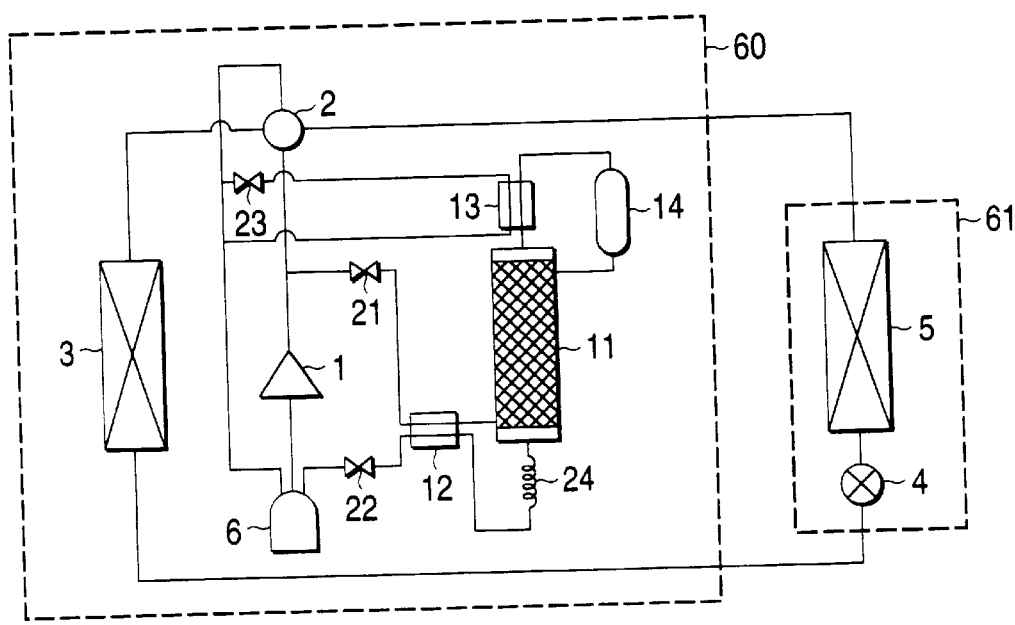
FIG. 5 is a diagram showing a refrigerant circuit configuration according to Embodiment 3 of the invention.

FIG. 5 is a diagram showing a refrigerant circuit configuration according to yet another embodiment of the invention, in which the first cooler 12 for cooling the refrigerant output form the compressor 1 to be supplied into the refrigerant rectifier column 11 is adapted to receive the liquid refrigerant emerging from the bottom of the rectifier column 11 after it has been brought to a low-temperature and pressure state by means of the capillary 24.

In order to increase the low-boiling point fraction of the refrigerant circulating through the refrigeration cycle, the same procedure as employed for the system shown in FIG. 1 may be adopted; solenoid valves 21, 22 and 23 are opened and a portion of the vapor output from the compressor 1 is cooled to either saturation or a state consisting of two phases, liquid and vapor, before it is supplied into the rectifier column 11. The liquid portion of the two-phase refrigerant flowing into the rectifier column 11 and the liquid refrigerant descending through the rectifier column 1 are passed through the capillary 24, where they are brought to a low-temperature and pressure state consisting of two phases, vapor and liquid, and thence flowed into the first cooler 12 for use as a cooling source. The low-temperature and pressure refrigerant consisting of two phases, vapor and liquid, which has flowed into the first cooler 12 is heated close to the saturation point and the resulting nearly vaporized refrigerant passes through solenoid valve 22 to flow into the accumulator 6 which serves as the second refrigerant reservoir.

Thus, in the third embodiment of the invention, the liquid refrigerant in the rectifier column 11 is used as a cooling source for the first cooler in order to increase the low-boiling point fraction of the refrigerant circulating through the refrigeration cycle. Compared to the case shown in FIG. 1 where the refrigerant to be drawn into the compressor 1 is used as a cooling source, the third embodiment has the advantage of reducing the number of sites at which the refrigeration cycle is connected to the refrigerant rectifier column so that the overall construction of the apparatus is sufficiently simplified to reduce its cost.

Embodiment 4

Figure 6:
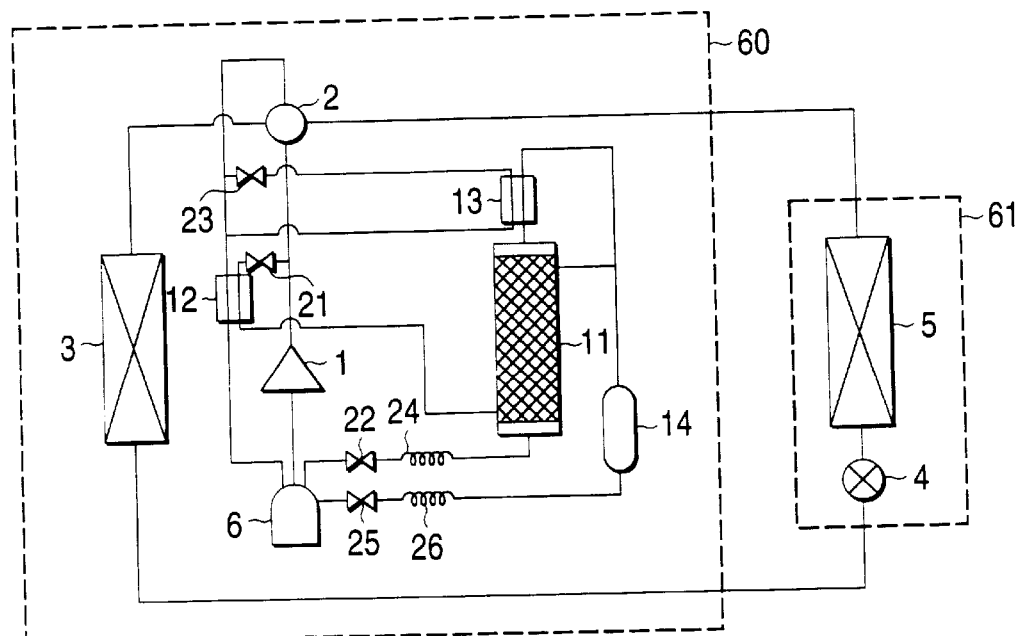
FIG. 6 is a diagram showing a refrigerant circuit configuration according to Embodiment 4 of the invention.

FIG. 6 is a diagram showing a refrigerant circuit configuration according to yet another embodiment of the invention, in which the top of the refrigerant rectifier column 11 is connected to the refrigerant container 14 via the second cooler 13 and the pipe between the second cooler 13 and the refrigerant container 14 is connected to the top of the rectifier column 11. In addition, the bottom of the refrigerant container 14 which serves as the first refrigerant reservoir is connected to the accumulator 6 which serves as the second refrigerant reservoir, via a capillary 26 serving as a third pressure reducer and a solenoid valve 25 serving as a third ON/OFF valve.

In order to increase the low-boiling point fraction of the refrigerant circulating through the refrigeration cycle, the following procedure may be taken. First, solenoid valves 21, 22 and 23 are opened and solenoid valve 25 is closed. A portion of the vapor output from the compressor 1 is cooled by the first cooler 12 such that it is brought to either saturation or a state consisting of two phases, vapor and liquid, before it is supplied into the refrigerant rectifier column 11. The vapor phase of the two-phase refrigerant flowing into the rectifier column 11 ascends through it. The ascending refrigerant vapor exiting from the top of the rectifier 11 is cooled in the second cooler 13, whereupon it condenses to liquefy. A portion of the resulting liquid refrigerant flows as a reflex into the rectifier 11 from the top and the remainder flows into the refrigerant container 14 and collects there. Thus, in the rectifier column 11, the ascending refrigerant vapor contacts the descending liquid refrigerant and the resulting heat and mass transfer provides a so-called "rectifying action" such that the refrigerant vapor ascending through the rectifier column 11 becomes progressively enriched with the low-boiling point fraction, causing the liquid refrigerant rich in the low-boiling point fraction to collect in the refrigerant container 14.

Thus, according to the fourth embodiment of the invention, the low-boiling point fraction of the refrigerant circulating through the refrigeration cycle is increased by dividing the liquid refrigerant from the second cooler 13 into two streams, one of which is allowed to collect in the refrigerant container 14 while the other stream is supplied as a reflex into the rectifier column 11 from the top; this feature helps eliminate the constraint of providing the refrigerant container 14 at a higher position than the rectifier column 11 as in the system shown in FIG. 1, thereby enabling the overall apparatus to be constructed in a compact size.

In order to change the composition of the refrigerant circulating through the refrigeration cycle from the state where it is enriched with the high-boiling point fraction to a state where it is enriched with the low-boiling point fraction, the following procedure may be taken. Solenoid valves 21, 22 and 23 are closed and solenoid valve 25 is opened and the high-pressure liquid refrigerant collecting in the container 14 which is rich with the low-boiling point fraction is passed through the capillary 26 so that it is brought to a lower pressure; thereafter, the refrigerant passes through the solenoid valve 25 to flow into the accumulator 6.

Embodiment 5

Figure 7:
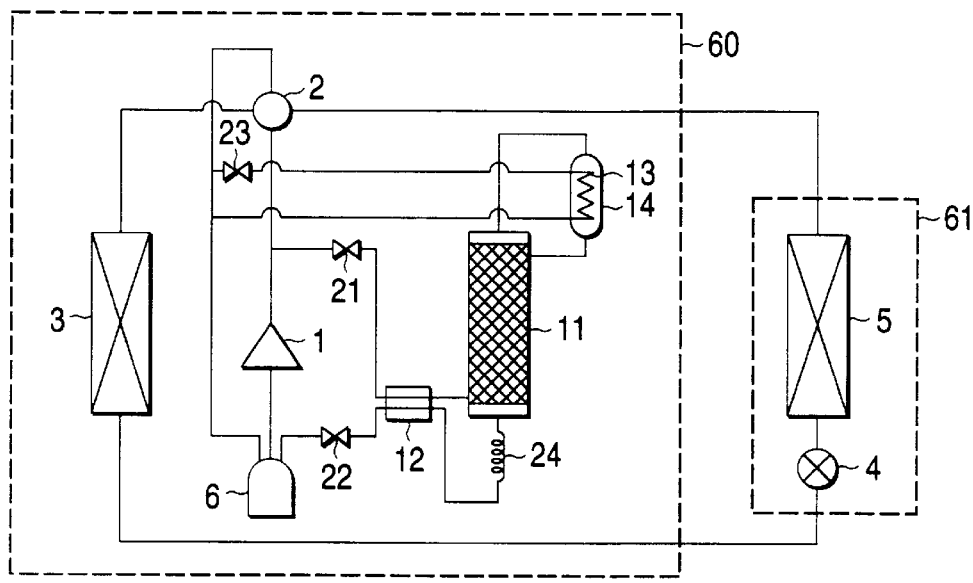
FIG. 7 is a diagram showing a refrigerant circuit configuration according to Embodiment 5 of the invention.

FIG. 7 is a diagram showing a refrigerant circuit configuration according to still another embodiment of the invention, in which the second cooler 13 for cooling the refrigerant vapor ascending through the rectifier column 11 is placed within the refrigerant container 14 which is the first refrigerant reservoir. The procedures for changing the composition of the refrigerant circulating through the refrigeration cycle are identical to those employed for the system shown in FIG. 1 and need not be described here in detail, except that since the second cooler 13 is placed within the refrigerant container 14, the overall apparatus can be constructed in a compact size and, hence, it is available at low cost.

Embodiment 6

Figure 8:
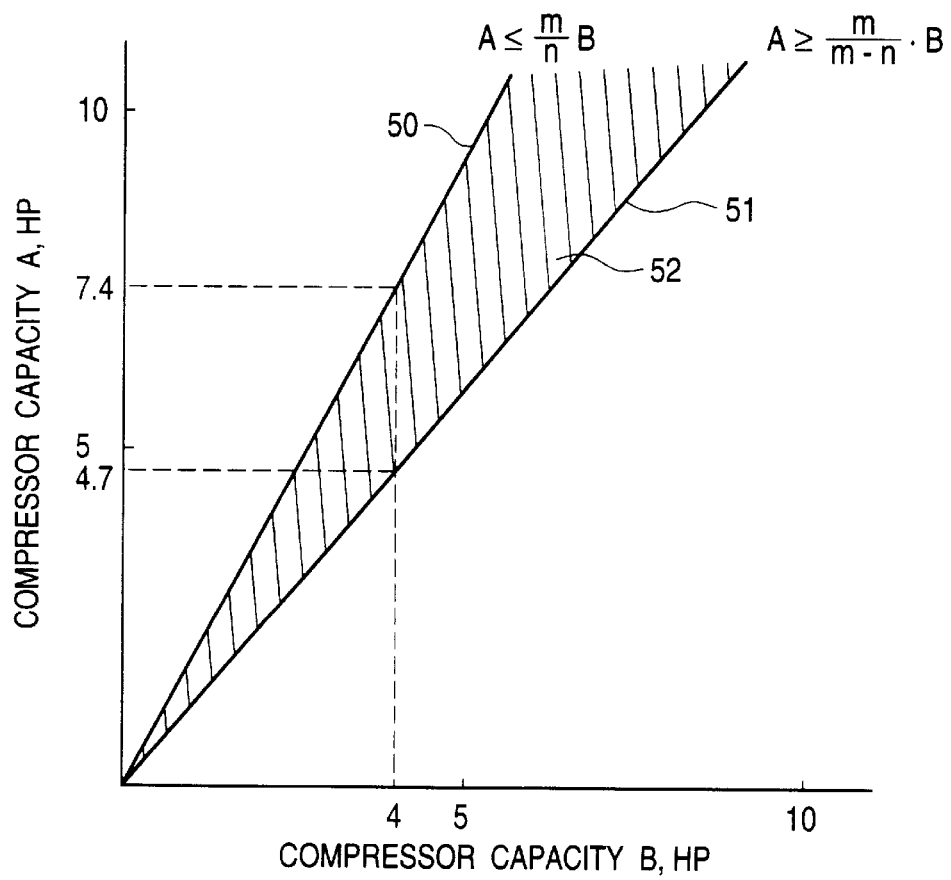
FIG. 8 is a diagram showing the distribution of compressor capacity ratios in Embodiment 6 of the invention.

FIG. 8 is a diagram showing a compressor combination profile according to a further embodiment of the invention. The low-boiling and high-boiling point fractions of the refrigerant circulating through the refrigeration cycle are increased by methods identical to those employed for the system shown in FIG. 1, and the refrigerant circuit configuration is identical to the one shown in FIG. 3. As already mentioned in Embodiment 1 with reference to a refrigeration cycle loaded with a mixed refrigerant consisting of 23% R32, 25% R125 and 52% R134a, the refrigeration performance expressed in relative values, with the performance at the loading composition (23% to 70% by adjusting the content of R32 over the range from 45% to 5%. Thus, in the embodiment under consideration, not only the performance control by adjustment of the composition of the circulating refrigerant as in Embodiment 1 but also the performance control by adjustment of the number of operating compressor units as in Embodiment 2 is adopted and the two control methods are combined in such a way that the least number of compressor units are employed and yet a broad range of performance control can be ensured with high efficiency and sufficient flexibility to handle a broad range of loads on the user side.

FIG. 8 shows how, in a refrigeration cycle loaded with a refrigerant having the already mentioned composition (R32:R125:R134a=25%:25%:52%), two compressors of different nominal capacities should be combined in optimal capacity ratios (within a hatched area 52) to ensure smooth switchover of the compressors (continuous performance control) under a given load on the user side.

Two mathematical relations 50 and 51 take the switchover of the compressors into account and the compressor combination profile taking such changeover into consideration is represented by the hatched area 52.

Let us assume that the two compressor units 1a and 1b have nominal capacities of A and B (A≧B) and also assume that given a load of 10 HP on the user side, compressor unit 1b is operating at 4 HP whereas compressor unit 1a is operating at 4.7 to 7.4 HP. Given these conditions, relations 50 and 51 are derived as follows.

Symbol A represents the nominal capacity (HP) of compressor 1a and B represents the nominal capacity (HP) of compressor 1b, with B being equal to or smaller than A. by adjustment of the composition of the circulating refrigerant, the performance can be controlled over the range of from 130% (in FIG. 8, this corresponds to the case where m, or the maximal range of performance control that can be achieved by adjustment of the refrigerant's composition, is 130/100) to 70% (which corresponds to the case where n, or the minimal range of performance control that can be achieved by adjustment of the refrigerant's composition, is 70/100) and, therefore, the capacity (B) of compressor 1b at the maximal value of 130% must be greater than the capacity (A) of compressor 1a at the minimal value of 70%. In addition, the capacity (A) of compressor 1a at the maximal value of 130% must be greater than the combined performance of compressors 1a and 1b at the minimal value of 70%.

Figure 9:
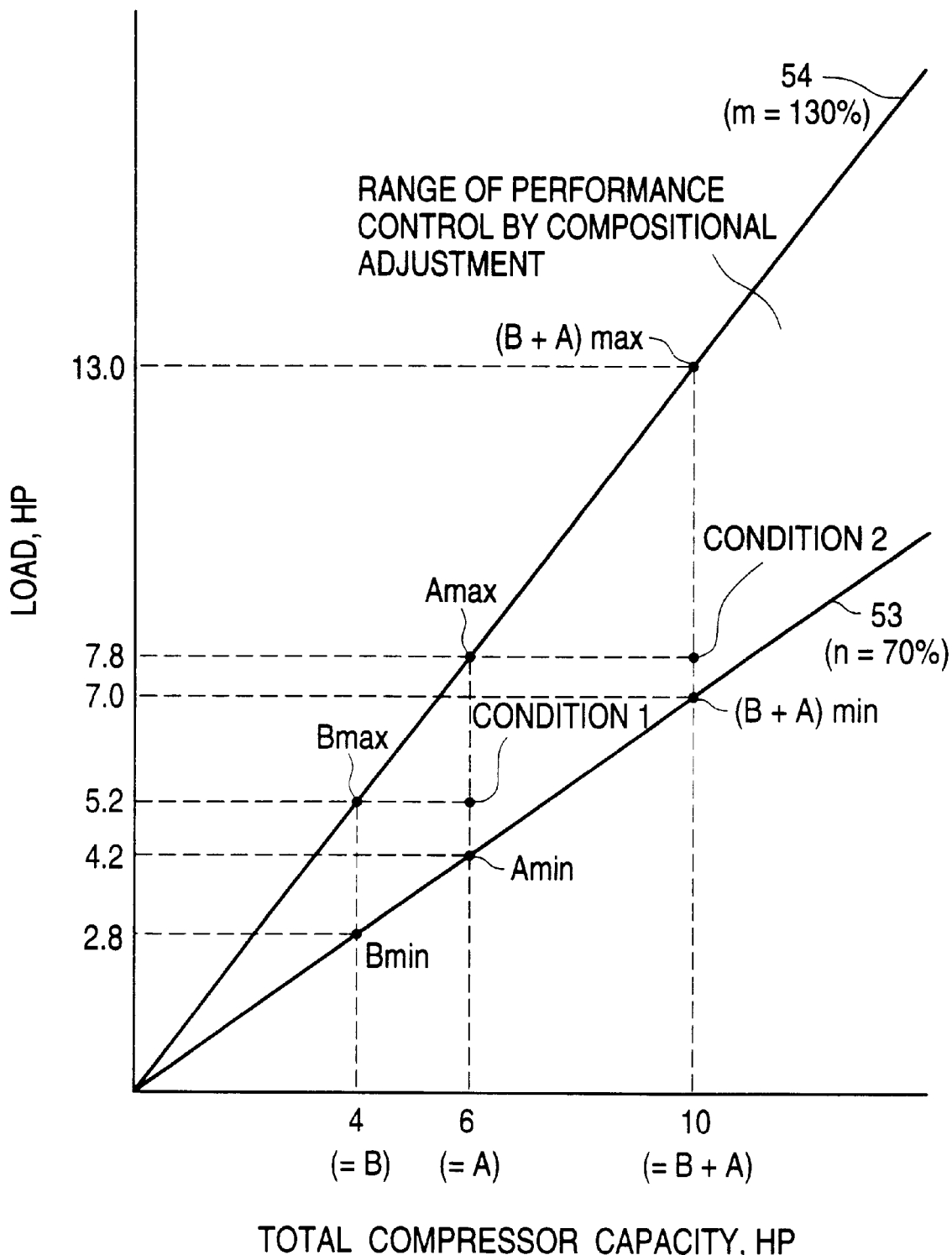
FIG. 9 is a graph showing the distributions of the load and the capacities of two compressor units in Embodiment 6 of the invention.

FIG. 9 is a graph showing the relationship between the load of the heat exchanger on the user side and the total capacity of two compressor units 1a and 1b. Line 53 represents the overall efficiency of the compressors at 70% (as multiplied by 0.7) and line 54 represents the overall efficiency of the compressors at 130%.

Take, for example, the case where 1a=6 HP and 1b=4 HP. The maximal value (max) of the capacities of the two compressors is given by 1.3×(6 HP+4 HP)=13 HP. In order to ensure smooth switchover between 1b, 1a and 1b+1a, the following conditions must be satisfied:

$B\max \geq A\min; B \times m \geq A \times n; A \leq (m/n) \times B$  Condition 1

(relation 50)

$A\max \geq (B+A)\min; A \times m \geq (B+A)n; A \geq \{n/(m-n)\} \times B$  Condition 2

(relation 51).

This means that 130% of the capacity of compressor 1a must be greater than 70% of the combined performance of compressors 1a and 1b.

Figure 10:
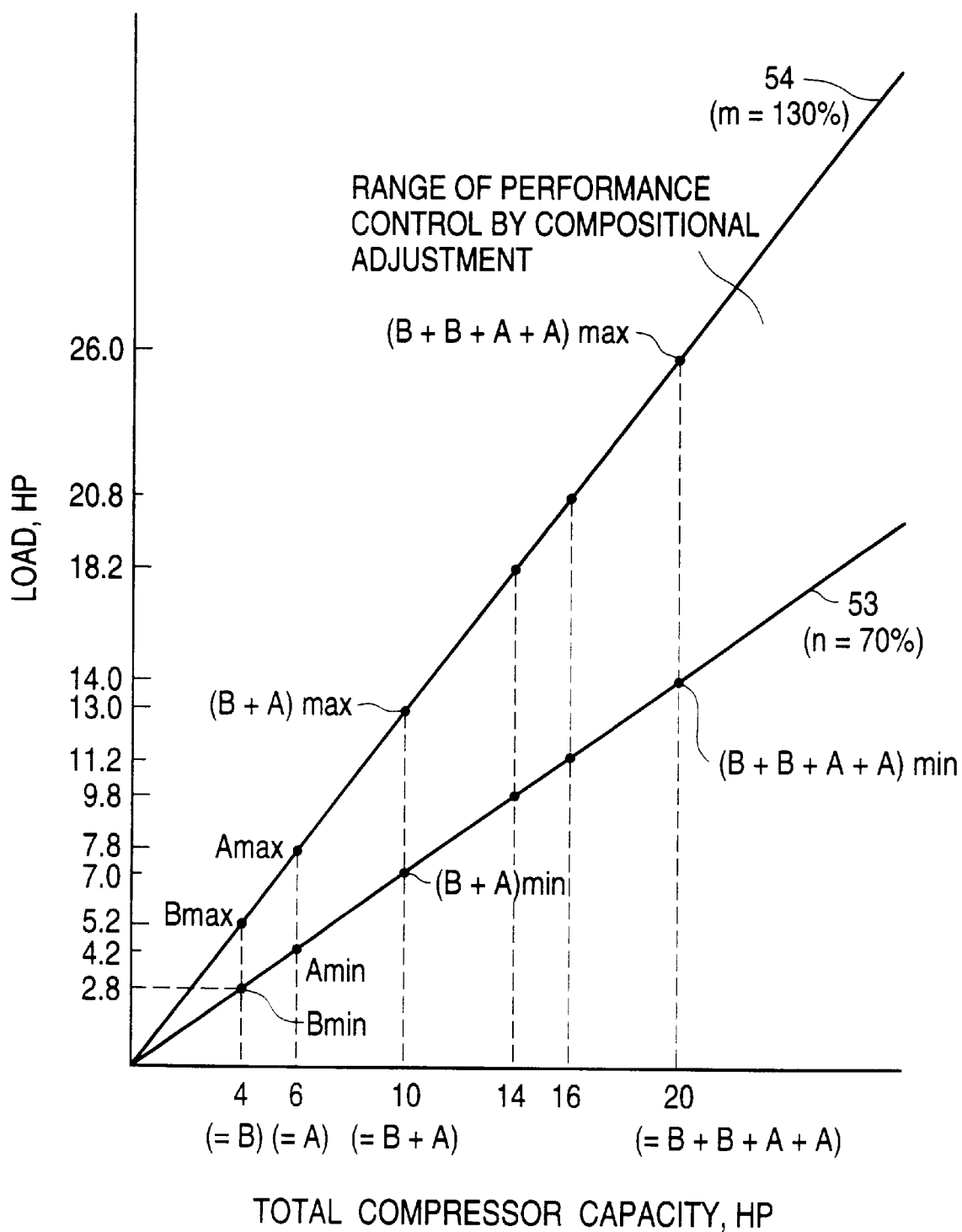
FIG. 10 is a graph showing the distributions of the load and the capacities of two units each of compressors having different capacities in Embodiment 6 of the invention.

FIG. 10 is a graph showing the relationship between the load on the user side and the total capacity of two compressor units 1a combined with two compressor units 1b. The performance can be controlled within the range bound by lines 53 and 54.

The foregoing discussion concerns the case where a refrigeration cycle loaded with a refrigerant having the already mentioned composition (R32:R125:R134$a$= 23%:25%:52%) is controlled in performance over the range of 70 to 130%. The concept of the invention is also applicable even if the refrigerant consists of components other than those mentioned above or even if R32, R125 and R134$a$ are mixed in proportions other than those listed above, and optimal compressor capacity ratios to ensure continuous performance control (smooth switchover of compressors) for handling a partial load (on the user side) can be selected by appropriately changing the values of m and n in relations 50 and 51 which represent the maximal and minimal levels, respectively, of the performance control range.

We next discuss the case where the load on the user side exceeds 10 HP and cannot adequately be handled by the above-described combination of compressors 1$a$ and 1$b$. Even in this case, the aforementioned combination of compressors 1$a$ and 1$b$ which satisfies optimal capacity ratios for the load of 10 HP may be supplemented with a third compressor unit 1$c$ in such a way that the least number of compressor units are employed and yet a broad range of performance control can be achieved with high efficiency. In this particular case, the three compressor units must be combined with their continuous performance control (smooth changeover taken) being taken into account.

Figure 11:
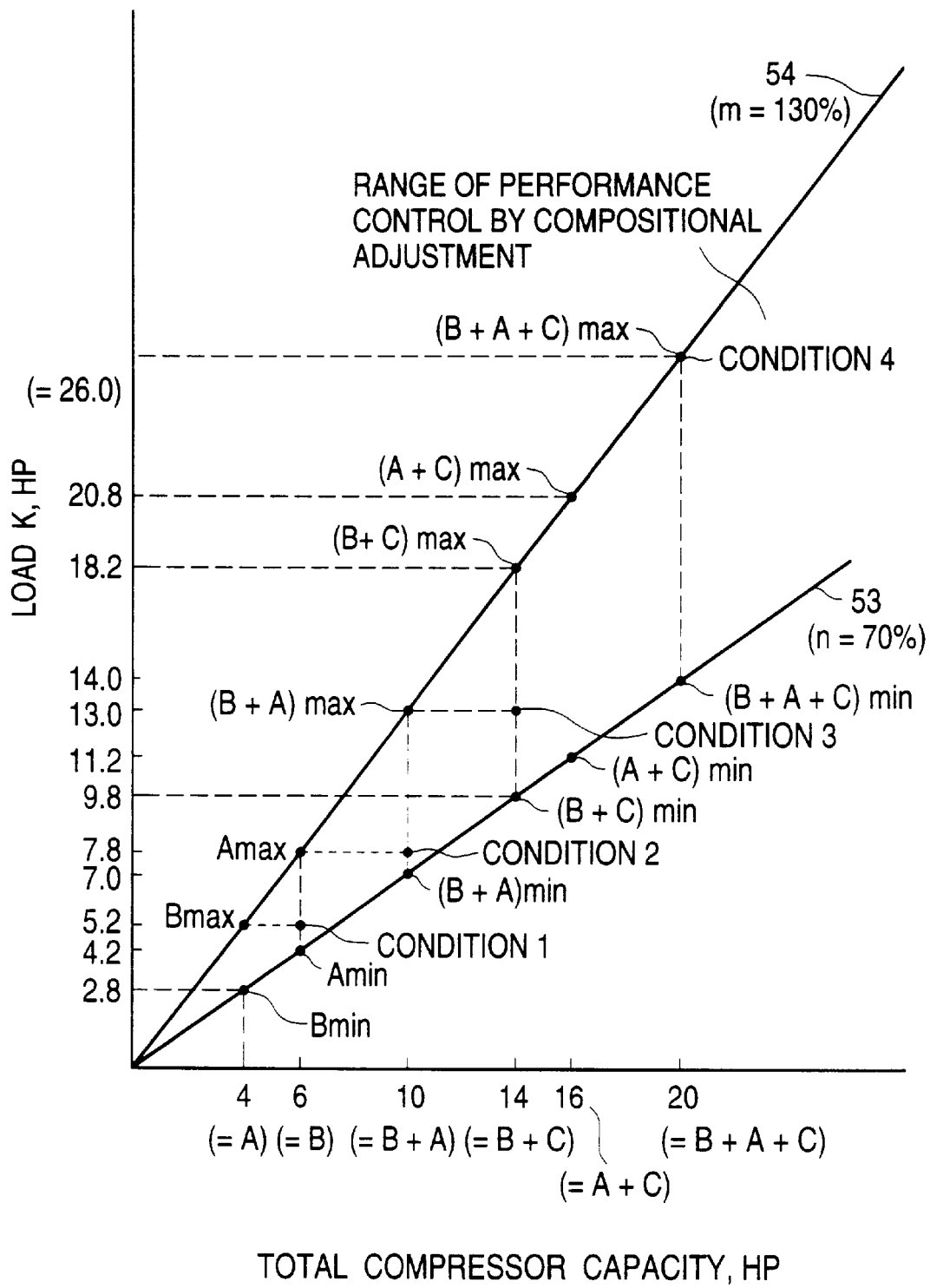
FIG. 11 is a graph showing the distributions of the load and the capacities of three compressor units in Embodiment 6 of the invention.

FIG. 11 is a graph plotting on the vertical axis the load k of the heat exchanger on the user side and on the horizontal axis the total capacity of compressors 1$a$, 1$b$ and 1$c$ used either individually or in various combinations. Given various value of the load on the user side, the three compressors must be changed over from one mode to another which are selected from among 1$b$, 1$a$, 1$b$+1$a$, 1$b$+1$c$, 1$a$+1$c$, and 1$b$+1$a$+1$c$. To meet this requirement, the following conditions have to be satisfied, with the capacities of compressors 1$a$, 1$b$ and 1$c$ being written as A, B and C, respectively:

$$(B+A)\max \geq (B+C)\min; \ (B+A)m \geq (B+C)n; \ C \leq (m/n)A+\{(m-n)/n\}B$$

(relation 55)

$$(A+B+C)\max \geq k; \ C \geq (k/m)-A-B \quad \text{Condition 4}$$

(relation 56)

If these conditions are satisfied, the least number of compressor units need be employed and yet a broad range of performance control can be ensured with high efficiency and sufficient flexibility to handle a broad range of loads on the user side.

From FIG. 11, one can see that if compressor 1$b$ has a capacity of 4 HP ad compressor 1$a$ a capacity of 6 HP, these compressors may be combined with compressor 1$c$ having a capacity of 5.4 HP to 14.6 HP in order to handle a 20 HP load on the user side. Alternatively, compressors 1$a$ and 1$b$ may be combined with two compressor units 1$c$ each having a capacity of 2.7 HP to 7.3 HP. We will now describe the case where in order to handle the load on the user side which is greater than 10 HP as exemplified by 30 HP or 40 HP, the aforementioned combination of compressors 1$a$ and 1$b$ which satisfies optimal capacity ratios for the load of 10 HP is supplemented with a plurality of units (z units) of compressor 1$c$ according to mathematical relations 57 and 58 to be set forth below, thereby ensuring continuous performance control in a sufficiently flexible way to handle a broad range of the load on the user side.

Given z units of compressor 1c, relations 55 and 56 are each divided by z to give:

$$C \leq [(m/n)A+\{(m-n)/n\}B]/z \quad \text{Condition 5}$$

(relation 57)

$$C \geq \{(k/m)-A-B\}/z \quad \text{Condition 6}$$

(relation 58).

In this case, too, the concept of the invention is also applicable even if the refrigerant consists of components other than R32, R125 and R134$a$ or even if R32, R125 and R134$a$ are mixed in proportions other than 23%, 25% and 52%, and optimal compressor capacity ratios to ensure continuous performance control can be selected by appropriately changing the values of k, m and n in relations 57 and 58 which respectively represent the load on the user side and the maximal and minimal levels of the performance control range.

Thus, in Embodiment 7 where the performance control is performed by adjusting not only the composition of the circulating refrigerant but also the number of operating units of compressors, a sufficiently broad capacity control range is realized to handle the load on the user side varying over a wide range from small to large capacities and, in addition, a further improvement in energy density can be accomplished.

Embodiment 7

Figure 12:
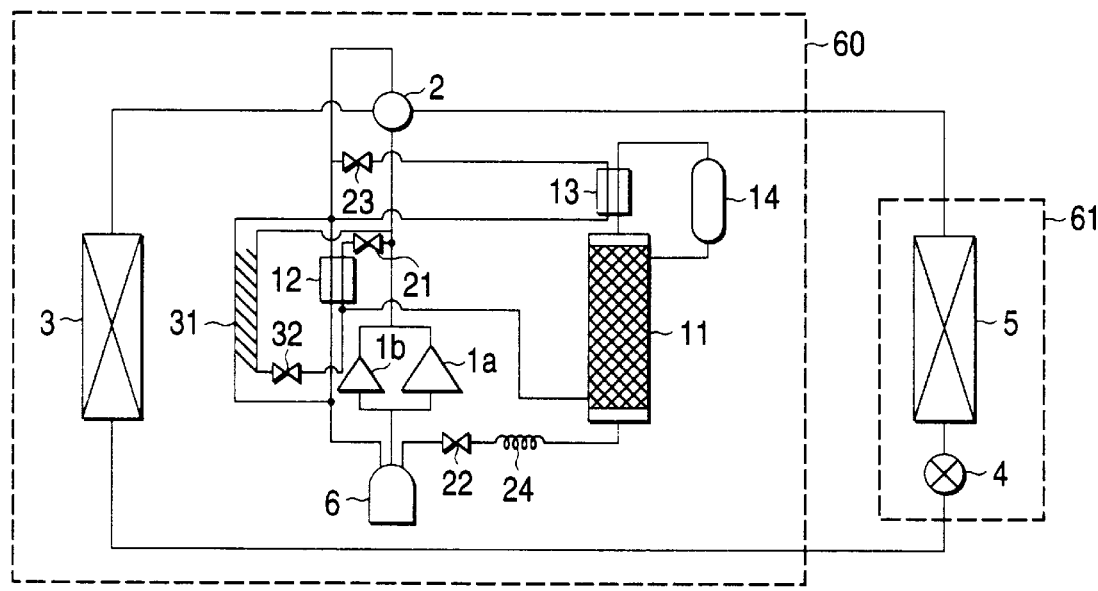
FIG. 12 is a diagram showing a refrigerant circuit configuration according to Embodiment 7 of the invention.

FIG. 12 is a diagram showing a refrigerant circuit configuration according to still another embodiment of the invention, in which the main circuit configuration of the outdoor machine is the same as in Embodiment 1 and those components or parts which are the same as employed in the prior art apparatus are identified by like numerals. The low-boiling or high-boiling point fraction of the refrigerant circulating through the refrigeration cycle may be increased by the same methods as employed for the system shown in FIG. 1. However, if transient load variations occur during the performance control by adjustment of the number of operating compressor units, the performance control by adjustment of the composition of the circulating refrigerant may be insufficient to absorb such variations and the evaporation pressure in the system may drop or the condensation pressure may increase unduly, whereupon it temporarily becomes impossible for the apparatus to operate with high efficiency. To deal with this situation, an auxiliary heat exchanger 31 is provided in Embodiment 7 that is made of a satisfactorily pressure-resistant material and which has a sufficient capacity to ensure that there will be neither drop in evaporation pressure nor undue increase in condensation pressure in the system in spite of variations in the load on the user side, thereby realizing a refrigerating air-conditioning apparatus that is capable of efficient operation during transient load variations.

The following discussion concerns the case of using tow compressor units but it will equally apply to other cases such as where only one compressor unit or more than two compressor units are employed.

The auxiliary heat exchanger 31 effects heat exchange between two pipes, one being a bypass by which the high-pressure and temperature side extending from the exits of the compressors 1$a$ and 1$b$ to the four-way valve 2 (the first pressure reducer 4) is connected to the bottom of the refrigerant rectifier column 11 via a solenoid valve 32 which is a fourth ON/OFF valve, and the other being a pipe passing through the solenoid valve 23 and the cooler 13 which is provided on the low-pressure side extending from the four-way valve 2 (the first pressure reducer 4) to the entrances of the compressors 1$a$ and 1$b$. The auxiliary heat exchanger 31 may typically be provided parallel to the first cooler such that the high-pressure and temperature refrigerant leaving the exits of the compressors 1a and 1b is subjected to heat exchange with the low-pressure and temperature refrigerant on the low-pressure side.

We will now describe the operation of the apparatus according to Embodiment 7 in a heating mode. If the condensation pressure in the system increases unduly in response to a transient variation in the load on the user side, solenoid valves 21, 22, 23 and 32 are opened, whereupon the high-pressure and temperature refrigerant leaving the exits of compressors 1a and 1b flows into the auxiliary heat exchanger 31 to effect heat exchange with the low-pressure and temperature refrigerant on the low-pressure side extending to the entrances of compressors 1a and 1b such that the condensation pressure in the system decreases, and the heat exchanged refrigerant merges with the high-pressure, two-phase refrigerant exiting the first cooler 12. When the condensation pressure in the system has dropped to a specified setting, solenoid valve 32 is closed and, with solenoid valves 21, 22 and 23 remaining open, the composition of the circulating refrigerant is adjusted until it matches the load on the user side.

Let us now describe the operation of the apparatus according to Embodiment 7 in a cooling mode. If the evaporation pressure in the system drops in response to a transient variation in the load on the user side, solenoid valves 21, 22, 23 and 32 are opened, whereupon the high-pressure and temperature refrigerant leaving the exits of compressors 1a and 1b flows into the auxiliary heat exchanger 31 to effect heat exchange with the low-pressure and temperature refrigerant on the low-pressure side extending to the entrances of compressors 1a and 1b such that the evaporation pressure in the system increases, and the heat exchanged refrigerant merges with the high-pressure, two-phase refrigerant exiting the first cooler 12. When the evaporation pressure in the system has increased to a specified setting, solenoid valve 32 is closed and, with solenoid valves 21, 22 and 23 remaining open, the composition of the circulating refrigerant is adjusted until it matches the load on the user side.

As described above, the provision of the auxiliary heat exchanger 31 enables the apparatus to be operated with high efficiency in the face of transient variations in the load on the user side. In addition, if the capacity of the first cooler 12 is insufficient to provide the necessary performance, the use of the auxiliary heat exchanger 31 ensures satisfactory performance.

Embodiment 8

Figure 13:
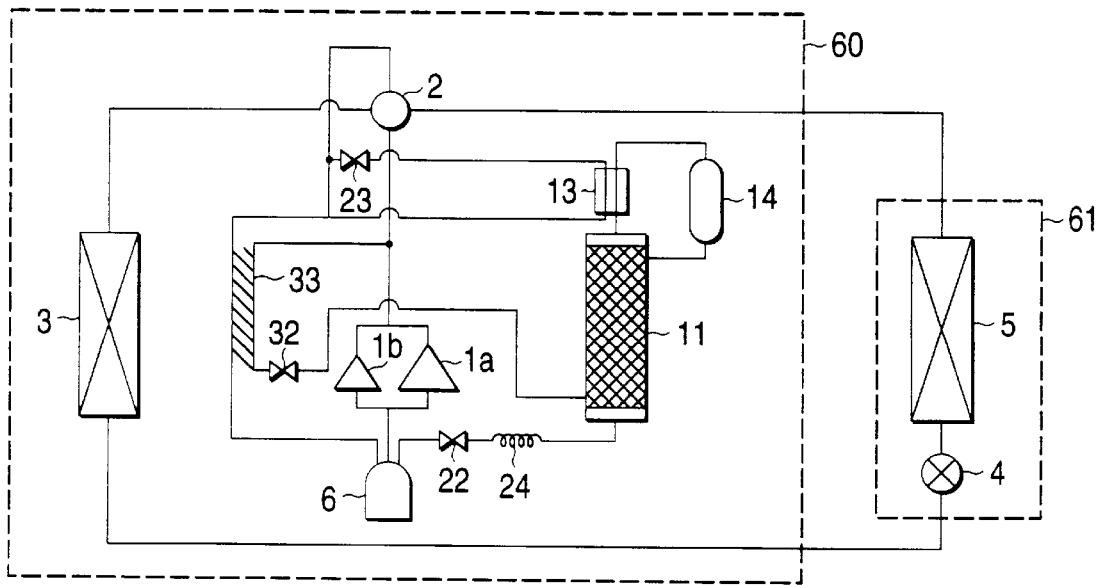
FIG. 13 is a diagram showing a refrigerant circuit configuration according to Embodiment 8 of the invention.

FIG. 13 is a diagram showing a refrigerant circuit configuration according to a further embodiment of the invention, in which the main circuit configuration and the operation of the outdoor machine are the same as in Embodiment 7. The low-boiling or high-boiling point fraction of the refrigerant circulating through the refrigeration cycle may be increased by the same methods as employed for the system shown in FIG. 1. In order to enable the apparatus to be operated with high efficiency in the face of transient variations in the load on the user side which occur during the performance control by adjustment of the number of operating compressor units, not only the auxiliary heat exchanger 31 but also the first cooler 12 is required in Embodiment 7. To deal with this situation, an auxiliary heat exchanger 33 is provided in Embodiment 8 that is made of a satisfactorily pressure-resistant material, that has a sufficient capacity to ensure that there will be neither drop in evaporation pressure nor undue increase in condensation pressure in the system in spite of variations in the load on the user side, and that serves not only as the auxiliary heat exchanger 31 but also as the first cooler 12, thereby realizing a low-cost refrigerating air-conditioning apparatus that is capable of efficient operation during transient load variations.

The auxiliary heat exchanger 33 effects heat exchange between two pipes, one being a bypass by which the high-pressure and temperature side extending from the exits of the compressors 1a and 1b to the four-way valve 2 (the first pressure reducer 4) is connected to the bottom of the refrigerant rectifier column 11 via the solenoid valve 32, and the other being a pipe conducting to the accumulator 6 past the solenoid valve 23 and the cooler 13 and which is provided on the low-pressure side extending from the four-way valve 2 (the first pressure reducer 5) to the entrances of the compressors 1a and 1b. Having a greater capacity than the first cooler 12, the auxiliary heat exchanger 33 also serves as said first cooler 12 and produces satisfactory power by itself without using the first cooler 12. The auxiliary heat exchanger 33 effects heat exchange between the high-pressure and temperature refrigerant leaving the exits of the compressors 1a and 1b with the low-pressure and temperature refrigerant on the low-pressure side.

We will now describe the operation of the apparatus according to Embodiment 8 in a heating mode. If the condensation pressure in the system increases unduly in response to a transient variation in the load on the user side, solenoid valves 22, 23 and 32 are opened, whereupon the high-pressure and temperature refrigerant leaving the exits of compressors 1a and 1b flows into the cooler and auxiliary heat exchanger combination 33 to effect heat exchange with the low-pressure and temperature refrigerant on the low-pressure side extending to the entrances of compressors 1a and 1b such that the condensation pressure in the system decreases. The high-pressure side flows into the refrigerant rectifier column 11 and the low-pressure side flows into the accumulator 6. With solenoid valves 22, 23 and 32 remaining open, the composition of the circulating refrigerant is adjusted until the condensation pressure in the system has decreased to a load matching level.

Let us now describe the operation of the apparatus according to Embodiment 8 in a cooling mode. If the evaporation pressure in the system drops in response to a transient variation in the load on the user side, solenoid valves 22, 23 and 32 are opened, whereupon the high-pressure and temperature refrigerant leaving the exits of compressors 1a and 1b flows into the cooler and auxiliary heat exchanger combination 33 to effect heat exchange with the low-pressure and temperature refrigerant on the low-pressure side extending to the entrances of compressors 1a and 1b such that the evaporation pressure in the system increases. The high-pressure side flows into the refrigerant rectifier column 11 and the low-pressure side flows into the accumulator 6. With solenoid valves 22, 23 and 32 remaining open, the composition of the circulating refrigerant is adjusted until the evaporation pressure in the system has increased to a load matching level.

As described above, the first cooler is combined with the heat exchanger having a sufficient capacity to ensure that there will be neither drop in evaporation pressure nor undue increase in condensation pressure in the system in the face of load variations; this allows for the provision of an apparatus that is simple in construction and which is available at low cost.

Embodiment 9

Figure 14:
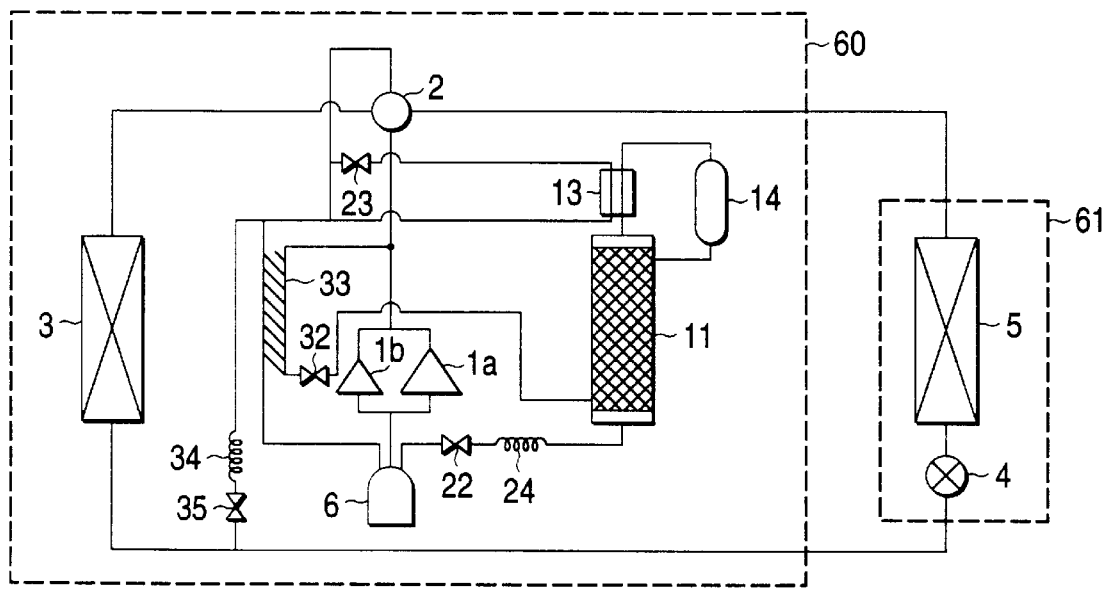
FIG. 14 is a diagram showing a refrigerant circuit configuration according to Embodiment 9 of the invention.

FIG. 14 is a diagram showing a refrigerant circuit configuration according to a still further embodiment of the invention, in which the main circuit configuration of the outdoor machine is the same as in Embodiment 7. The low-boiling or high-boiling point fraction of the refrigerant circulating through the refrigeration cycle may be increased by the same methods as employed for the system shown in FIG. 1. For preventing the decrease in operational efficiency due to the drop in the evaporation pressure in the system in response to a transient load variation in a cooling mode, it is more effective to subject the high-pressure and temperature refrigerant leaving the exits of compressors 1a and 1b to heat exchange with the low-pressure and temperature refrigerant on the low-pressure side which has a comparatively low degree of dryness rather than with the low-pressure and temperature refrigerant on the low-pressure side which has a comparatively high degree of dryness. Hence, in Embodiment 9, a bypass pipe is provided in such a way that the liquid side extending from the heat exchanger 3 on the heat source side to the first pressure reducer 4 is connected to the auxiliary heat exchanger 33 via a solenoid valve 35 which is a fifth ON/OFF valve and a capillary 34 which is a fourth pressure reducer, and the low-pressure and temperature refrigerant having a smaller degree of dryness is supplied into the auxiliary heat exchanger 33, thereby providing a refrigerating air-conditioning apparatus that can be operated with higher efficiency in spite of transient load variations.

The capillary 34 is the fourth pressure reducer provided in the bypass over which the high-pressure side extending from the heat exchanger 3 on the heat source side to the first pressure reducer 4 is connected to the auxiliary heat exchanger 33 via the solenoid valve 35.

We now describe the operation of the apparatus according to Embodiment 9 in the cooling mode. The operation in a heating mode is the same as in Embodiment 8. If the evaporation pressure in the system drops in response to a transient load variation during cooling, solenoid valves 22, 23, 32 and 35 are opened, whereupon the high-pressure and temperature refrigerant leaving the exits of compressors 1a and 1b flows into the auxiliary heat exchanger 33 and undergoes heat exchange with the low-pressure and temperature refrigerant of a comparatively low degree of dryness that branches from the liquid side extending from the heat exchanger 3 on the heat source side to the first pressure reducer 4 and which has flowed into the auxiliary heat exchanger 33 via the solenoid valve 35 and the capillary 34, whereby the evaporation pressure in the system is increased; the high-pressure side then flows into the refrigerant rectifier column 11 and the low-pressure side flows into the accumulator 6. When the evaporation pressure in the system has rose to a specified setting, solenoid valve 35 is closed and, with solenoid valves 22, 23 and 32 remaining open, the composition of the circulating refrigerant is adjusted until a load matching level is attained.

As described above, a branch of the high-pressure liquid side flows through the bypass channel to the cooler and auxiliary heat exchanger combination via the fifth ON/OFF valve 35, thereby providing for more efficient operation in the face of transient load variations.

Advantages of the Invention

As described on the foregoing pages, the refrigerating air-conditioning apparatus set forth in (1) comprises a refrigeration cycle comprising a compressor, a heat exchanger on the heat source side, a first pressure reducer and a heat exchanger on the user side, a non-azeotropic mixed refrigerant consisting of a low-boiling point refrigerant and a high-boiling point refrigerant, a refrigerant rectifier column for producing a refrigerant rich in the high-boiling point fraction from a portion of the mixed refrigerant, a first refrigerant reservoir for storing a refrigerant rich in the low-boiling point fraction which exits the refrigerant rectifier column and a second refrigerant reservoir for storing a refrigerant rich in the high-boiling point fraction, and the levels of the liquid refrigerant in the first and the second refrigerant reservoir are adjusted to change the composition of the mixed refrigerant continuously; as a result, the apparatus provides a broad compositional control range and has high energy efficiency.

The refrigerating air-conditioning apparatus set forth in (2) comprises a refrigeration cycle comprising a compressor, a heat exchanger on the heat source side, a first pressure reducer and a heat exchanger on the user side, a non-azeotropic mixed refrigerant consisting of a low-boiling point refrigerant and a high-boiling point refrigerant and a refrigerant rectifier column for producing a refrigerant rich in the low-boiling point fraction from a portion of the mixed refrigerant, and the high-pressure side extending from the exit of the compressor to the first pressure reducer is connected to the bottom of said refrigerant rectifier column via a first ON/OFF valve and a first cooler whereas the bottom of the refrigerant rectifier column is connected to the low-pressure side extending from the first pressure reducer to the entrance of the compressor via a second pressure reducer and a second ON/OFF valve, and a loop including a second cooler and a first refrigerant reservoir is connected to the top of the refrigerant rectifier column; as a result, the apparatus provides a broad compositional control change and has high energy efficiency.

The refrigerating air-conditioning apparatus set forth in (3) comprises a refrigeration cycle comprising a compressor, a heat exchanger on the heat source side, a first pressure reducer and a heat exchanger on the user side, a non-azeotropic mixed refrigerant consisting of a low-boiling point refrigerant and a high-boiling point refrigerant and a refrigerant rectifier column for producing a refrigerant rich in the low-boiling point fraction from a portion of the mixed refrigerant, and the high-pressure side extending from the exit of the compressor to the first pressure reducer is connected to the bottom of the refrigerant rectifier column via a first ON/OFF valve and a first cooler whereas the bottom of the refrigerant rectifier column is connected to the low-pressure side extending from the first pressure reducer to the entrance of the compressor via a second pressure reducer and a second ON/OFF valve, the top of the refrigerant rectifier column is connected to a first refrigerant reservoir via a second cooler, the pipe between the second cooler and the first refrigerant reservoir is connected to the top of the refrigerant rectifier column, and the bottom of the first refrigerant reservoir is connected to the low-pressure side extending from the first pressure reducer to the entrance of the compressor via a third pressure reducer and a third ON/OFF valve; as a result, the apparatus is free from any constraints in the installation of the refrigerant vessel and yet provides a broad compositional control range and has high energy efficiency.

In the refrigerating air-conditioning apparatus set forth in (4), the first cooler is adapted to be such that the pipe connecting the first ON/OFF valve and the refrigerant rectifier column is subjected to heat exchange with the pipe extending from the first pressure reducer to the entrance of the compressor; as a result, a further improvement in energy efficiency is achieved.

In the refrigerating air-conditioning apparatus set forth in (5), the first cooler is adapted to be such that the pipe connecting the first ON/OFF valve and the bottom of the refrigerant rectifier column is subjected to heat exchange with the pipe connecting the second pressure reducer and the second ON/OFF valve; as a result, the apparatus is simplified in construction and available at low cost.

The refrigerating air-conditioning apparatus set forth in (6) comprises a refrigeration cycle comprising a compressor, a heat exchanger on the heat source side, a first pressure reducer and a heat exchanger on the user side, a non-azeotropic mixed refrigerant consisting of a low-boiling point refrigerant and a high-boiling point refrigerant and a refrigerant rectifier column for producing a refrigerant rich in the low-boiling point fraction from the mixed refrigerant, and high-pressure side extending from the exit of said compressor to the first pressure reducer is connected to the bottom of said refrigerant rectifier column via a fourth ON/OFF valve, the bottom of the refrigerant rectifier column is connected to the low-pressure side extending from said first pressure reducer to the entrance of the compressor via a second pressure reducer and a second ON/OFF valve, a loop including a second cooler and a first refrigerant reservoir is connected to the top of the refrigerant rectifier column, and an auxiliary heat exchanger is provided such that the pipe by which the high-pressure and temperature side extending from the exit of the compressor to said first pressure reducer is connected to the bottom of the refrigerant rectifier column via the fourth ON/OFF valve is subjected to heat exchange with the pipe connecting via the second cooler to the low-pressure side extending from the first pressure reducer to the entrance of the compressor; as a result, the apparatus is simplified in construction and available at low cost.

In the refrigerating air-conditioning apparatus set forth in (7), the pipe for the liquid side extending from the heat exchanger on the heat source side to the first pressure reducer is connected to the auxiliary heat exchanger via a fifth ON/OFF valve and a fourth pressure reducer; as a result, the apparatus can be operated with higher efficiency in the face of transient load variations.

The refrigerating air-conditioning apparatus set forth in (8) has the second cooler provided within the first refrigerant reservoir; as a result, the overall size of the apparatus becomes compact and it is available at low cost.

The refrigerating air-conditioning apparatus set forth in (9) employs a plurality of compressor units connected in parallel and the number of operating compressor units is controlled; as a result, a broad performance control range is provided and a further improvement in energy efficiency can be achieved.

In the refrigerating air-conditioning apparatus set forth in (10) which uses the non-azeotropic mixed refrigerant, two compressor units, one having a greater capacity than the other, are provided such that a minimal output produced by compositional adjustment from the compressor of the greater capacity is smaller than a maximal output produced by compositional adjustment from the compressor of the smaller capacity; as a result, a broad enough performance control range is attained to handle the load on the user side ranging from a small to a large capacity and a yet a further improvement in energy efficiency can be achieved.

The refrigerating air-conditioning apparatus set forth in (11) satisfies the following relation:

$$B \times n/(m-n) \leq A \leq B \times m/n$$

where A is the capacity of the compressor of the greater capacity; B is the capacity of the compressor of the smaller capacity; m is a maximal value for the range of performance control by adjustment of the refrigerant's composition; and n is a minimal value for the range of performance control by adjustment of the refrigerant's composition, and the number of operating compressor units is controlled with one compressor being combined with the other; as a result, a broad enough performance control range is attained to handle the load on the user side ranging from a small to a large capacity and yet a further improvement in energy efficiency can be achieved.

The refrigerating air-conditioning apparatus set forth in (12) satisfies the following relation:

$$\{(k/m)-A-B\}-z \leq C \leq [(m/n)A+\{(m-n)/n\}B]/z$$

where A is the capacity of the compressor of the greater capacity; B is the capacity of the compressor of the smaller capacity; C is the capacity of at least one compressor compensating for the insufficiency in the load of the heat exchanger on the user side that can be handled by the two compressors having the capacities A and B; m is a maximal value for the range of performance control by adjustment of the refrigerant's composition; n is a minimal value for the range of performance control by adjustment of the refrigerant's composition; k is the load on the user side; and z is the number of compressor units having the capacity C, and the number of operating compressor units is controlled with the respective compressors being combined with each other; as a result, a broad enough performance control range is attained to handle the load on the user side ranging from a small to a large capacity and yet a further improvement in energy efficiency can be achieved.

The refrigerating air-conditioning apparatus set forth in (13) has an auxiliary heat exchanger in such a way that the pipe by which the high-pressure and temperature side extending from the exit of the compressor to the first pressure reducer is connected to the bottom of the refrigerant rectifier column via the fourth ON/OFF valve is subjected to heat exchange with the pipe connecting via the second cooler to the low-pressure side extending from said first pressure reducer to the entrance of the compressor; as a result, highly efficient operation can be accomplished in the face of transient load variations.

What is claimed is:

1. A refrigerating air-conditioning apparatus which comprises:

a refrigeration cycle comprising a compressor, a heat exchanger on the heat source side, a first pressure reducer and a heat exchanger on the user side;

a non-azeotropic mixed refrigerant consisting of a low-boiling point refrigerant and a high-boiling point refrigerant;

a refrigerant rectifier column for producing a refrigerant rich in the low-boiling point fraction from a portion of said mixed refrigerant, a first refrigerant reservoir for storing a refrigerant rich in the low-boiling point fraction which exits said refrigerant rectifier column;

a second refrigerant reservoir, included in said refrigeration cycle, for storing a surplus amount of said non-azeotropic mixed refrigerant, so as to allow a total amount of said non-azeotropic mixed refrigerant flowing through said refrigeration cycle to be changed; and a plurality of compressor units connected in parallel, wherein the number of operating compressor units is controlled;

wherein said plurality of compressor units includes at least a first and a second compressor unit, wherein a first compressor unit has a greater capacity than a second compressor unit, and are provided such that a minimal output produced by compositional adjustment from said first compressor is smaller than a maximal output produced by compositional adjustment from said second compressor;

wherein the levels of the liquid refrigerant in said first refrigerant reservoir and said second refrigerant reservoir are adjusted to change the composition of said mixed refrigerant continuously.

2. A refrigerating air-conditioning apparatus which comprises:

a refrigeration cycle comprising a compressor, a heat exchanger on the heat source side, a first pressure reducer and a heat exchanger on the user side;

a non-azeotropic mixed refrigerant consisting of a low-boiling point refrigerant and a high-boiling point refrigerant; and a refrigerant rectifier column for producing a refrigerant rich in the low-boiling point fraction from a portion of said mixed refrigerant, wherein the high-pressure side extending from the exit of said compressor to said first pressure reducer is connected to the bottom of said refrigerant rectifier column via a first ON/OFF valve and a first cooler whereas the bottom of said refrigerant rectifier column is connected to the low-pressure side extending from said first pressure reducer to the entrance of said compressor via a second pressure reducer and a second ON/OFF valve, and a loop including a second cooler and a first refrigerant reservoir is connected to the top of said refrigerant rectifier column.

3. The refrigerating air-conditioning apparatus according to claim 2, wherein the first cooler is adapted to be such that the pipe connecting the first ON/OFF valve and the refrigerant rectifier column is subjected to heat exchange with the pipe extending from the first pressure reducer to the entrance of the compressor.

4. The refrigerating air-conditioning apparatus according to claim 2, wherein the first cooler is adapted to be such that the pipe connecting the first ON/OFF valve and the bottom of the refrigerant rectifier column is subjected to heat exchange with the pipe connecting the second pressure reducer and the second ON/OFF valve.

5. The refrigerating air-conditioning apparatus according to claims 2, wherein the second cooler is provided within the first refrigerant reservoir.

6. A refrigerating air-conditioning apparatus which comprises:

a refrigeration cycle comprising a compressor, a heat exchanger on the heat source side, a first pressure reducer and a heat exchanger on the user side;

a non-azeotropic mixed refrigerant consisting of a low-boiling point refrigerant and a high-boiling point refrigerant; and a refrigerant rectifier column for producing a refrigerant rich in the low-boiling point fraction from said mixed refrigerant, wherein the high-pressure side extending from the exit of said compressor to said first pressure reducer is connected to the bottom of said refrigerant rectifier column via a fourth ON/OFF valve, the bottom of said refrigerant rectifier column is connected to the low-pressure side extending from said first pressure reducer to the entrance of said compressor via a second pressure reducer and a second ON/OFF valve, a loop including a second cooler and a first refrigerant reservoir is connected to the top of said refrigerant rectifier column, and an auxiliary heat exchanger is provided such that the pipe by which the high-pressure and temperature side extending from the exit of said compressor to said first pressure reducer is connected to the bottom of said refrigerant rectifier column via said fourth ON/OFF valve is subjected to heat exchange with the pipe connecting via said second cooler to the low-pressure side extending from said first pressure reducer to the entrance of said compressor.

7. The refrigerant air-conditioning apparatus according to claim 6, wherein the pipe for the liquid side extending from the heat exchanger on the heat source side to the first pressure reducer is connected to the auxiliary heat exchanger via a fifth ON/OFF valve and a fourth pressure reducer.

8. A refrigerating air-conditioning apparatus which comprises:

a refrigeration cycle comprising a compressor, a heat exchanger on the heat source side, a first pressure reducer and a heat exchanger on the user side;

a non-azeotropic mixed refrigerant consisting of a low-boiling point refrigerant and a high-boiling point refrigerant; and a refrigerant rectifier column for producing a refrigerant rich in the low-boiling point fraction from a portion of said mixed refrigerant, wherein the high-pressure side extending from the exit of said compressor to said first pressure reducer is connected to the bottom of said refrigerant rectifier column via a first ON/OFF valve and a first cooler whereas the bottom of said refrigerant rectifier column is connected to the low-pressure side extending from said first pressure reducer to the entrance of said compressor via a second pressure reducer and a second ON/OFF valve, the top of said refrigerant rectifier column is connected to a first refrigerant reservoir via a second cooler, the pipe between said second cooler and said first refrigerant reservoir is connected to the top of said refrigerant rectifier column, and the bottom of said first refrigerant reservoir is connected to the low-pressure side extending from said first pressure reducer to the entrance of said compressor via a third pressure reducer and a third ON/OFF valve.

9. A refrigerating air-conditioning apparatus which comprises:

a refrigeration cycle comprising a heat exchanger on the heat source side, a first pressure reducer, a heat exchanger on the user side, and at least two compressor units, one having a greater capacity than the other, are provided such that a minimal output produced by compositional adjustment from the compressor of the greater capacity is smaller than a maximal output produced by compositional adjustment from the compressor of smaller capacity;

a non-azeotropic mixed refrigerant consisting of a low-boiling point refrigerant and a high-boiling point refrigerant;

a refrigerant rectifier column for producing a refrigerant rich in the high-boiling point fraction from a portion of said mixed refrigerant, a first refrigerant reservoir for storing a refrigerant rich in the low-boiling point fraction which exits said refrigerant rectifier column; and a second refrigerant reservoir for storing a refrigerant rich in the high-boiling point fraction;

wherein the levels of the liquid refrigerant in said first refrigerant reservoir and said second refrigerant reservoir are adjusted to change the composition of said mixed refrigerant continuously;

wherein said refrigerating air-conditioning apparatus satisfies the following relation:

$$B \times n/(m-n) \leq A \leq B \times m/n$$

where A is the capacity of the compressor of the greater capacity; B is the capacity of the compressor of the smaller capacity; m is a maximal value for the range of performance control by adjustment of the refrigerant's composition; and n is a minimal value for the range of performance control by adjustment of the refrigerant's composition, and wherein the number of operating compressor units is controlled with one compressor being combined with the other.

10. A refrigerating air-conditioning apparatus which comprises:

a refrigeration cycle comprising a heat exchanger on the heat source side, a first pressure reducer, a heat exchanger on the user side, and at least two compressor units, one having a greater capacity than the other, are provided such that a minimal output produced by compositional adjustment from the compressor of the greater capacity is smaller than a maximal output produced by compositional adjustment from the compressor of smaller capacity;

a non-azeotropic mixed refrigerant consisting of a low-boiling point refrigerant and a high-boiling point refrigerant;

a refrigerant rectifier column for producing a refrigerant rich in the high-boiling point fraction from a portion of said mixed refrigerant, a first refrigerant reservoir for storing a refrigerant rich in the low-boiling point fraction which exits said refrigerant rectifier column; and a second refrigerant reservoir for storing a refrigerant rich in the high-boiling point fraction;

wherein the levels of the liquid refrigerant in said first refrigerant reservoir and said second refrigerant reservoir are adjusted to change the composition of said mixed refrigerant continuously;

wherein said refrigerating air-conditioning apparatus satisfies the following relation:

$$\{(k/m)-A-B\}/z \leq C \leq [(m/n)A+\{(m-n)/n\}B]/z$$

where A is the capacity of the compressor of the greater capacity; B is the capacity of the compressor of the smaller capacity; C is the capacity of at least one compressor compensating for the insufficiency in the load of the heat exchanger on the user side that can be handled by the two compressors having the capacities A and B; m is a maximal value for the range of performance control by adjustment of the refrigerant's composition; n is a minimal value for the range of performance control by adjustment of the refrigerant's composition; k is the load on the user side; and z is the number of compressor units having capacity C, and wherein the number of operating compressor units is controlled with the respective compressors being combined with each other.

11. A refrigerating air-conditioning apparatus which comprises:

a refrigeration cycle comprising a compressor, a heat exchanger on the heat source side, a first pressure reducer and a heat exchanger on the user side;

a non-azeotropic mixed refrigerant consisting of a low-boiling point refrigerant and a high-boiling point refrigerant;

a refrigerant rectifier column for producing a refrigerant rich in the high-boiling point fraction from a portion of said mixed refrigerant, a first refrigerant reservoir for storing a refrigerant rich in the low-boiling point fraction which exits said refrigerant rectifier column;

a second refrigerant reservoir for storing a refrigerant rich in the high-boiling point fraction; and an auxiliary heat exchanger wherein the pipe which the high-pressure and temperature side extending from the exit of the compressor to the first pressure reducer is connected to the bottom of the refrigerant rectifier column via the fourth ON/OFF valve is subjected to heat exchange with the pipe connecting via the second cooler to the low-pressure side extending from said first pressure reducer to the entrance of the compressor;

wherein the levels of the liquid refrigerant in said first refrigerant reservoir and said second refrigerant reservoir are adjusted to change the composition of said mixed refrigerant continuously.

* * * * *